United States Patent
Takagi

(10) Patent No.: US 9,620,897 B2
(45) Date of Patent: Apr. 11, 2017

(54) ELECTRICAL CONNECTOR

(71) Applicant: Japan Aviation Electronics, Limited, Tokyo (JP)

(72) Inventor: Youhei Takagi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 15/142,303

(22) Filed: Apr. 29, 2016

(65) Prior Publication Data

US 2017/0025789 A1    Jan. 26, 2017

(30) Foreign Application Priority Data

Jul. 24, 2015  (JP) .................................. 2015-146375

(51) Int. Cl.
*H01R 13/629* (2006.01)
*H01R 13/639* (2006.01)
*B60L 11/18* (2006.01)

(52) U.S. Cl.
CPC .... *H01R 13/62933* (2013.01); *B60L 11/1818* (2013.01); *H01R 13/639* (2013.01)

(58) Field of Classification Search
CPC ........................ H01R 13/6271; H01R 13/629
USPC .................... 439/310, 304, 34, 352
See application file for complete search history.

(56) References Cited

U.S. PATENT DOCUMENTS

| | | | | |
|---|---|---|---|---|
| 5,676,560 A * | 10/1997 | Endo | ................... | B60L 11/1818 439/310 |
| 8,016,607 B2 * | 9/2011 | Brown, II | ........... | B60L 11/1818 439/34 |
| 8,206,171 B2 * | 6/2012 | Osawa | ................. | H01R 13/502 439/352 |
| 8,500,476 B2 * | 8/2013 | Hori | ................. | H01R 13/62944 439/310 |
| 8,529,273 B2 * | 9/2013 | Maegawa | ........... | B60L 11/1818 439/206 |
| 2012/0108097 A1 * | 5/2012 | Takagi | ............... | H01R 13/6275 439/345 |
| 2013/0303014 A1 * | 11/2013 | Takagi | ............... | H01R 13/6275 439/350 |
| 2015/0111408 A1 * | 4/2015 | Sasaki | ................. | H01R 13/627 439/357 |

FOREIGN PATENT DOCUMENTS

JP  2014-3005 A  1/2014

* cited by examiner

*Primary Examiner* — Tulsidas C Patel
*Assistant Examiner* — Marcus Harcum
(74) *Attorney, Agent, or Firm* — Collard & Roe, P.C.

(57) ABSTRACT

A connector includes a locking lever that locks a fitted state with an inlet, a release button that is provided to be movable in Z-direction positive and negative directions and rotates the locking lever by moving in the Z-direction negative direction to release the locking, a release restricting portion that is provided to be movable in X-direction positive and negative directions and to be movable to an abutting position where the release restricting portion abuts against the release button, thereby restricting the movement in the Z-direction negative direction of the release button at the abutting position to restrict the release of the locking, a solenoid as a moving portion that moves the release restricting portion in the X-direction negative direction, and a coil spring that presses the release restricting portion in the X-direction positive direction.

9 Claims, 20 Drawing Sheets

ELECTRICAL CONNECTOR

This application is based upon and claims the benefit of priority from Japanese Patent Application No. 2015-146375, filed on Jul. 24, 2015, the disclosure of which is incorporated herein in its entirety by reference,

TECHNICAL FIELD

This invention relates to an electrical connector.

BACKGROUND ART

In a fitting structure between a connector and an inlet in an electrical connector unit, there may be provided a locking portion that prevents the connector from coming off the inlet when the connector and the inlet have reached a predetermined fitting position.

In such a structure, a release portion such as a release button is also required for releasing the locking by the locking portion when detaching the connector from the inlet.

On the other hand, in the state where the connector and the inlet are fitted together, charging may be carried out, but if the locking is released due to, for example, an operation of the release portion in error during the charging, there is a possibility of electric leakage.

Therefore, in such a structure, there may also be required a structure configured to fix the release portion to disable an operation of the locking portion in the state where the connector and the inlet are locked together.

As such a structure, as described in, for example, JP-A-2014-3005 (hereinafter referred to as Patent Document 1), there is a structure in which a plunger of a solenoid is provided with a member that restricts the movement of a release portion, thereby fixing the release portion by bringing the member into contact with the release portion.

This structure will be described in more detail with reference to FIG. 26,

As shown in FIG. 26, a connector 100 of Patent Document 1 includes a swing arm 10 having a retaining hook 12 for locking a fitted state with an inlet, a release lever 20 for releasing the locking by the swing arm 10, a solenoid slider 60 having a preventing portion receiver 63 that restricts the movement of the release lever 20, and a solenoid 50 that drives the solenoid slider 60. A movable iron core 52 of the solenoid 50 is fixed to the solenoid slider 60 by a pin 55.

In this structure, the solenoid 50 drives the solenoid slider 60 to move the preventing portion receiver 63 to a position corresponding to a swing preventing portion 238 of the release lever 20 so that the movement of the release lever 20 is prevented by the preventing portion receiver 63, and therefore, the release lever 20 can be fixed.

SUMMARY OF THE INVENTION

However, in the structure of Patent Document 1, since the movable iron core 52 of the solenoid 50 is fixed to the solenoid slider 60 by the pin 55, a force applied from the release lever 20 to the solenoid slider 60 is transmitted directly to the solenoid 50.

Therefore, there has been a problem that if an attempt is made to forcibly operate the release lever 20 in the state where the release lever 20 is fixed, there is a possibility of failure of the solenoid 50.

This invention has been made in view of the above-mentioned problem and has an object to provide an electrical connector in which a solenoid is tougher to fail than conventional even when the electrical connector has a structure configured to restrict the movement of a release portion using the solenoid.

In order to achieve the object mentioned above, according to an aspect of the present invention, an electrical connector comprising: a locking lever that is rotatable and locks a fitted state with an inlet; a release portion that is provided to be movable in a first direction and a second direction parallel and opposite to the first direction and rotates the locking lever by moving in the first direction to release locking; a release restricting portion that is provided to be movable in a third direction crossing the first and second directions and in a fourth direction parallel and opposite to the third direction and to be movable to an abutting position which is a position where the release restricting portion, in its movable range, abuts against the release portion moving in the first direction, thereby restricting a movement in the first direction of the release portion at the abutting position to restrict release of the locking; a moving portion that moves the release restricting portion in the third direction; and a pressing portion that presses the release restricting portion in the fourth direction which is a direction approaching the moving portion, wherein the moving portion is a solenoid comprising a plunger that moves in the third and fourth directions, and wherein the release restricting portion comprises; a slide portion that is movable in the third and fourth directions; and a contact portion which is provided to the slide portion and restricts the movement of the release portion by abutting against the release portion and against which the plunger abuts is provided.

The slide portion may have a bottom surface parallel to the third and fourth directions, wherein the contact portion is a projecting portion provided to project from the slide portion toward the release portion and having an abutting surface against which the plunger moving in the third direction abuts, and wherein an end on the release portion side of the projecting portion has a restricting portion that abuts against the release portion moving in the first direction to restrict the release of the locking by the release portion.

The electrical connector may further comprise: a guide bar provided on a side, opposite to a side where the plunger projects, of the solenoid and configured to move in the third and fourth directions in response to a movement of the plunger; and a switch provided to be able to be operated with the guide bar and configured to produce first information indicating a position of the plunger in a state operated with the guide bar and second information indicating a position of the plunger in a state not operated with the guide bar.

The electrical connector may further comprise a holding portion holding the solenoid and the switch.

The electrical connector may further comprise an outer shell housing the slide portion, wherein, in a state of restricting the release of the locking, the slide portion is disposed at a position where at least a part of the slide portion can be visually recognized from the outside of the outer shell.

The electrical connector may further comprise: a guide portion provided is to project in the third direction from the contact portion; and a recess which is provided on the outer shell and into which the guide portion is inserted.

The slide portion may have a bottom surface parallel to the third and fourth directions, wherein the contact portion is a projecting portion provided to project from the slide portion toward the release portion and having an abutting surface against which the plunger moving in the third direction abuts, and wherein an end on the release portion side of the projecting portion has a restricting portion that abuts against the release portion moving in the first direction to restrict the release of the locking by the release portion.

The restricting portion may have a plate shape whose normal direction is parallel to the first and second directions and which projects to the plunger side.

The restricting portion may have a plate shape whose normal direction is parallel to the first and second directions and which projects to a side opposite to the plunger side.

The slide portion may have a support portion projecting to the plunger side more than the projecting portion.

According to this invention, it is possible to provide an electrical connector in which a solenoid is tougher to fail than conventional even when the electrical connector has a structure configured to restrict the movement of a release portion using the solenoid,

MODE FOR CARRYING OUT THE INVENTION

Hereinbelow, preferred embodiments of this invention will be described in detail with reference to the drawings.

First, referring to FIGS. 1 to 4, the outline of a connector unit 200 (electrical connector unit) according to a first embodiment will be described.

Herein, as the connector unit 200, there is shown by way of example a connector unit for a battery charger for an electric car.

Figure 1:
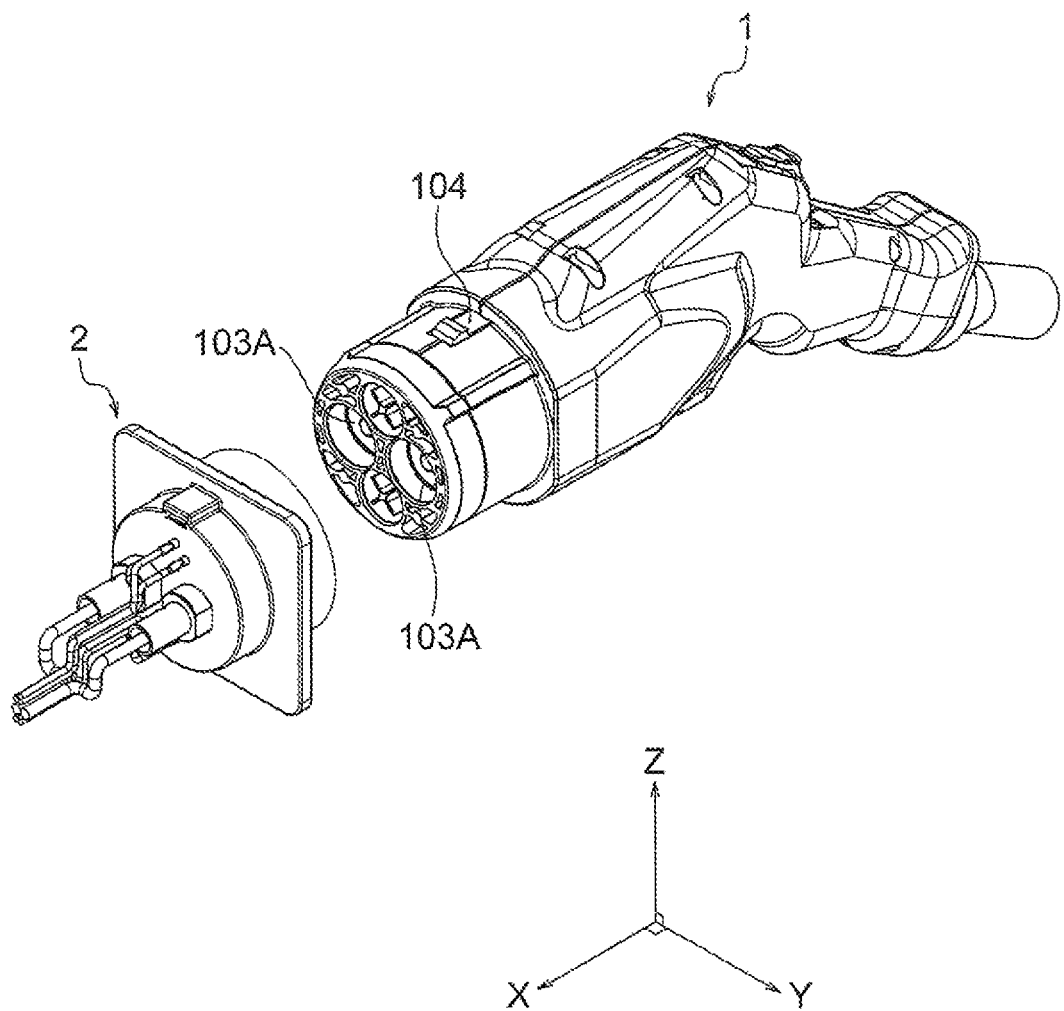
FIG. 1 is a perspective view showing a connector unit 200 according to a first embodiment of this invention.

In the following description, the direction of a member is expressed using an orthogonal coordinate system and, as shown in FIG. 1, an X-direction, a Y-direction perpendicular to the X-direction, and a Z-direction perpendicular to the X- and Y-directions are defined as three directions in the orthogonal coordinate system.

In the X-, Y-, and Z-directions, a direction indicated by an arrow in FIG. 1 is given as a "positive direction", while a direction opposite to the direction indicated by the arrow is given as a "negative direction".

As shown in FIGS. 1 to 4, the connector unit 200 includes a connector 1 as an electrical connector and an inlet 2 as a mating connector configured to be fitted to the connector 1.

Herein, the connector 1 is a connector provided on the battery charger side, while the inlet 2 is a connector provided on the electric car side.

As shown in FIGS. 1 to 4, the connector 1 includes a locking lever 104 that is rotatable and locks a fitted state with the inlet 2, and a release lever 105 having a release button 105A as a release portion that is provided to be movable is in the Z-direction negative direction as a first direction and in the Z-direction positive direction as a second direction parallel and opposite to the first direction and rotates the locking lever 104 by moving in the Z-direction negative direction to release the locking. The connector 1 further includes a release restricting portion 135 that is provided to be movable in the X-direction negative direction as a third direction crossing (herein perpendicular to) the Z-direction negative direction and the Z-direction positive direction and in the X-direction positive direction as a fourth direction parallel and opposite to the X-direction negative direction and to be movable to an abutting position $P_L$ (see FIG. 12) which is a position where the release restricting portion 135, in its movable range abuts against the release button 105A moving in the Z-direction negative direction, thereby restricting the movement in the Z-direction negative direction of the release button 105A at the abutting position $P_L$ to restrict the release of the locking. The connector 1 further includes a solenoid 131 as a moving portion that moves the release restricting portion 135 in the X-direction negative direction, and a coil spring 137 as a pressing portion that presses the release restricting portion 135 in the X-direction positive direction which is a direction approaching the solenoid 131.

The solenoid 131 includes a plunger 131A that moves in the X-direction positive direction and the X-direction negative direction. The release restricting portion 135 includes a slide portion 181 (see FIG. 5) movable in the X-direction positive direction and the X-direction negative direction and a projecting portion 185 (see FIG. 5) as a contact portion which is provided to the slide portion 181 and restricts the movement of the release button 105A by abutting against the release button 105A and against which the plunger 131A abuts.

Next, referring to FIGS. 2 and 6 to 9, the structures of the connector 1 and the inlet 2 will be described in detail.

Figure 2:
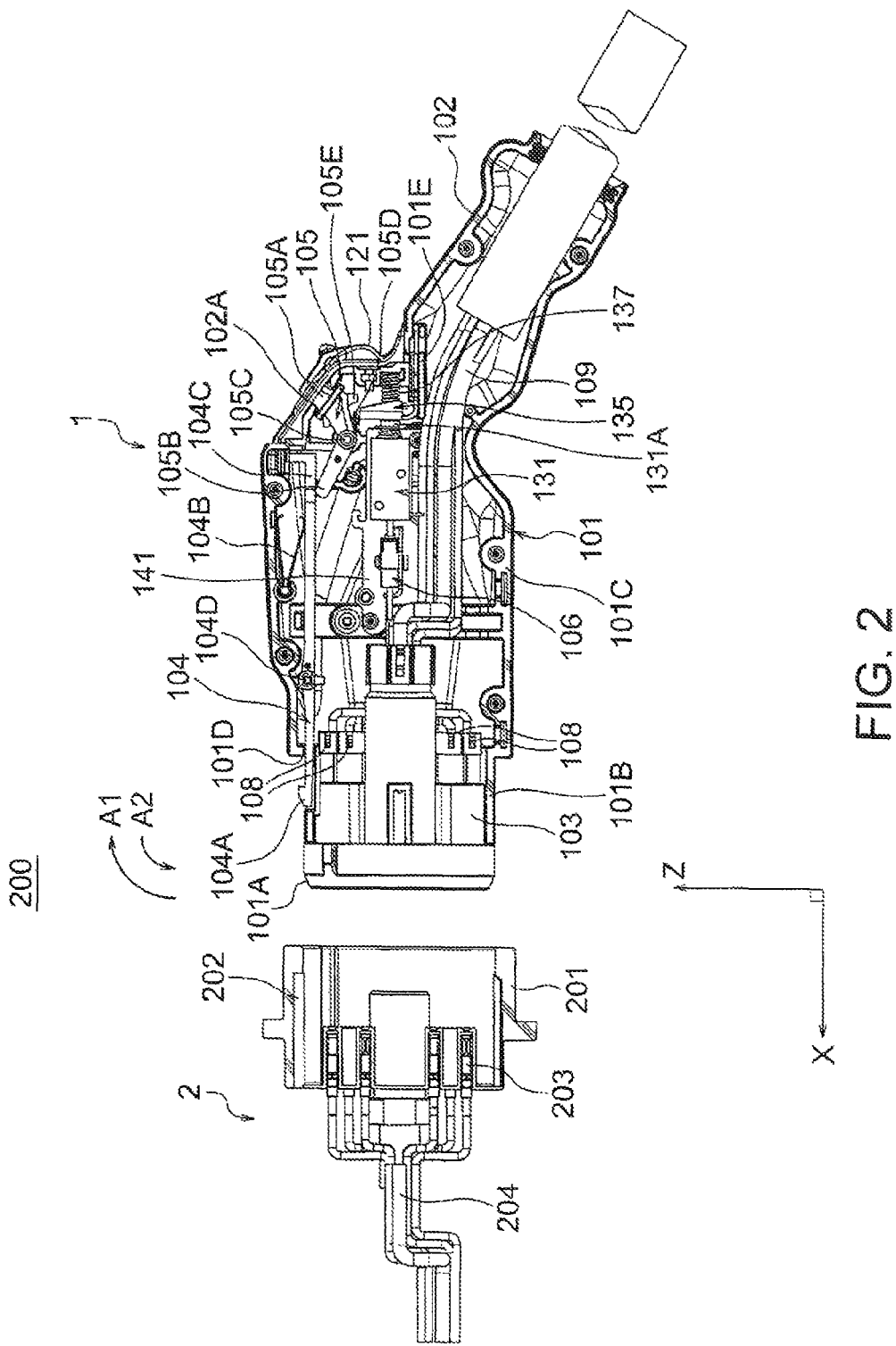
FIG. 2 is a side view (partially sectioned) in which the connector unit 200 of FIG. 1 is seen in a Y-direction negative direction.

As shown in FIG. 2, the connector 1 includes an outer shell 101, a grip 102 that is provided at one end of the outer shell 101 for an operator to hold the connector 1 during charging, an inner housing 103 which is provided in the outer shell 101 such that its end in the X-direction positive direction is exposed and in which contacts 108 are disposed, cables 109 that are provided in the outer shell 101 and connected to the contacts 108, and the locking lever 104 that is provided in the outer shell 101 and locks a fitted state between the connector 1 and the inlet 2 during the fitting (charging).

On the other hand, as shown in FIG. 2, the inlet 2 includes a tubular housing 201 into which the connector 1 is inserted, a recessed inlet-side locking portion 202 that is provided on the inner periphery of the housing 201 and brought into contact with a locking portion 104A of the locking lever 104 during locking, contacts 203 that are provided in the housing 201 with their ends exposed and are configured to be electrically connected to the contacts 108 of the connector 1 and cables 204 connected to the contacts 203.

The outer shell 101 is an outer cover of the connector 1 and, as shown in FIG. 2 includes a tubular large-diameter portion 1010 and a tubular small-diameter portion 101B provided at a front end in the X-direction positive direction of the large-diameter portion 1010, having a diameter smaller than that of the large-diameter portion 1010, and having a central axis that coincides with that of the large-diameter portion 101C.

A front end 101A of the small-diameter portion 101B is chamfered.

The inner housing 103 is an insulating member of a cylindrical shape corresponding to an inner peripheral shape of the small-diameter portion 101B and is provided in the small-diameter portion 101B.

The end of the inner housing 103 is exposed to the outside and a plurality of recesses 103A are provided at this end (see FIG. 1). The contacts 108 are fixed to the recesses 103A.

The locking lever 104 is a rod-shaped member provided in the large-diameter portion 1010 so as to face in a direction (X-direction) of fitting to the inlet 2 and is supported by a rotation shaft 1040 so as to be rotatable in directions A1 and A2 in FIG. 2, i.e. outward and inward of the outer shell 101.

Figure 3:
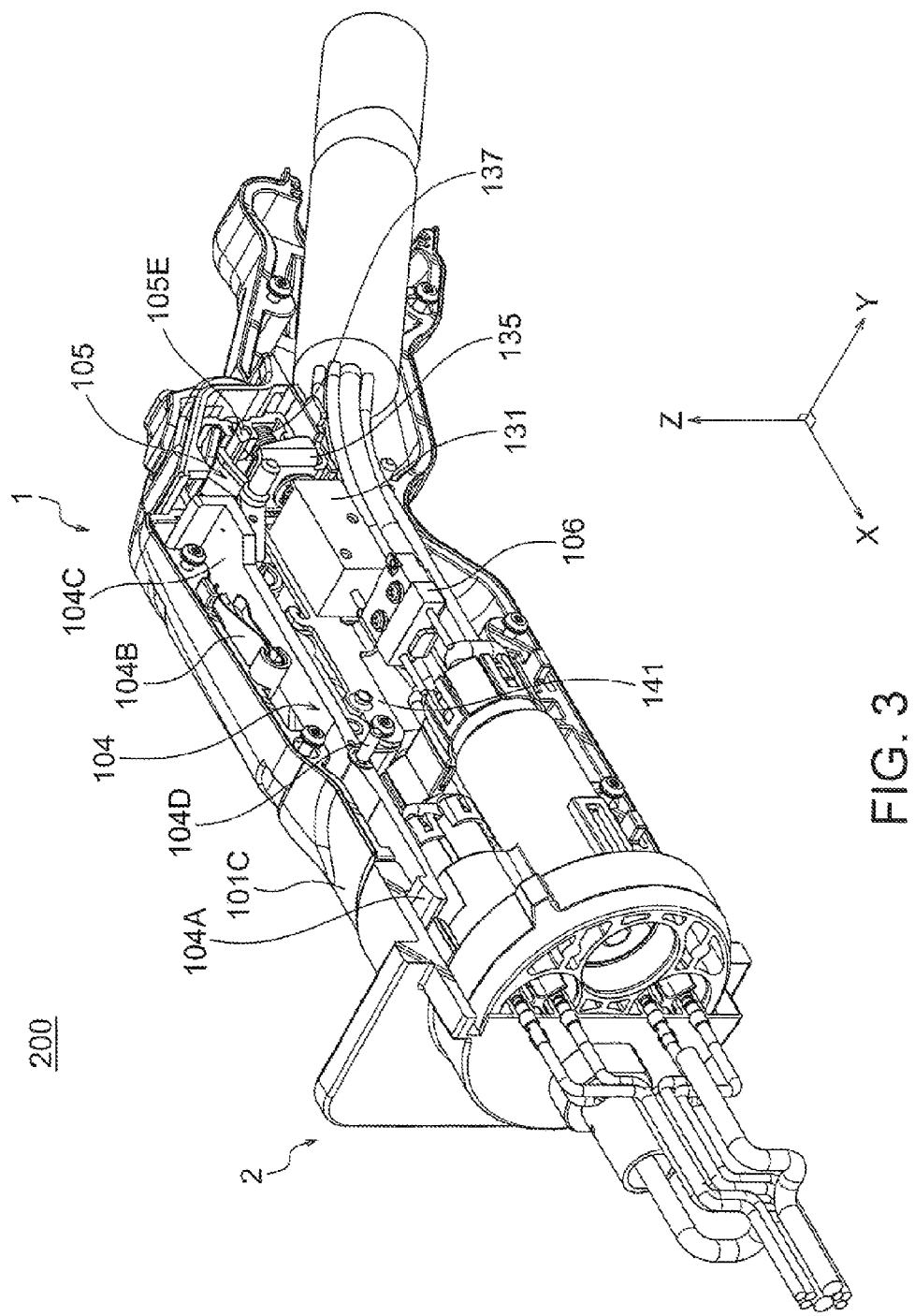
FIG. 3 is a partially sectioned perspective view showing a state in which a connector 1 and an inlet 2 of the connector unit 200 are fitted together.
Figure 4:
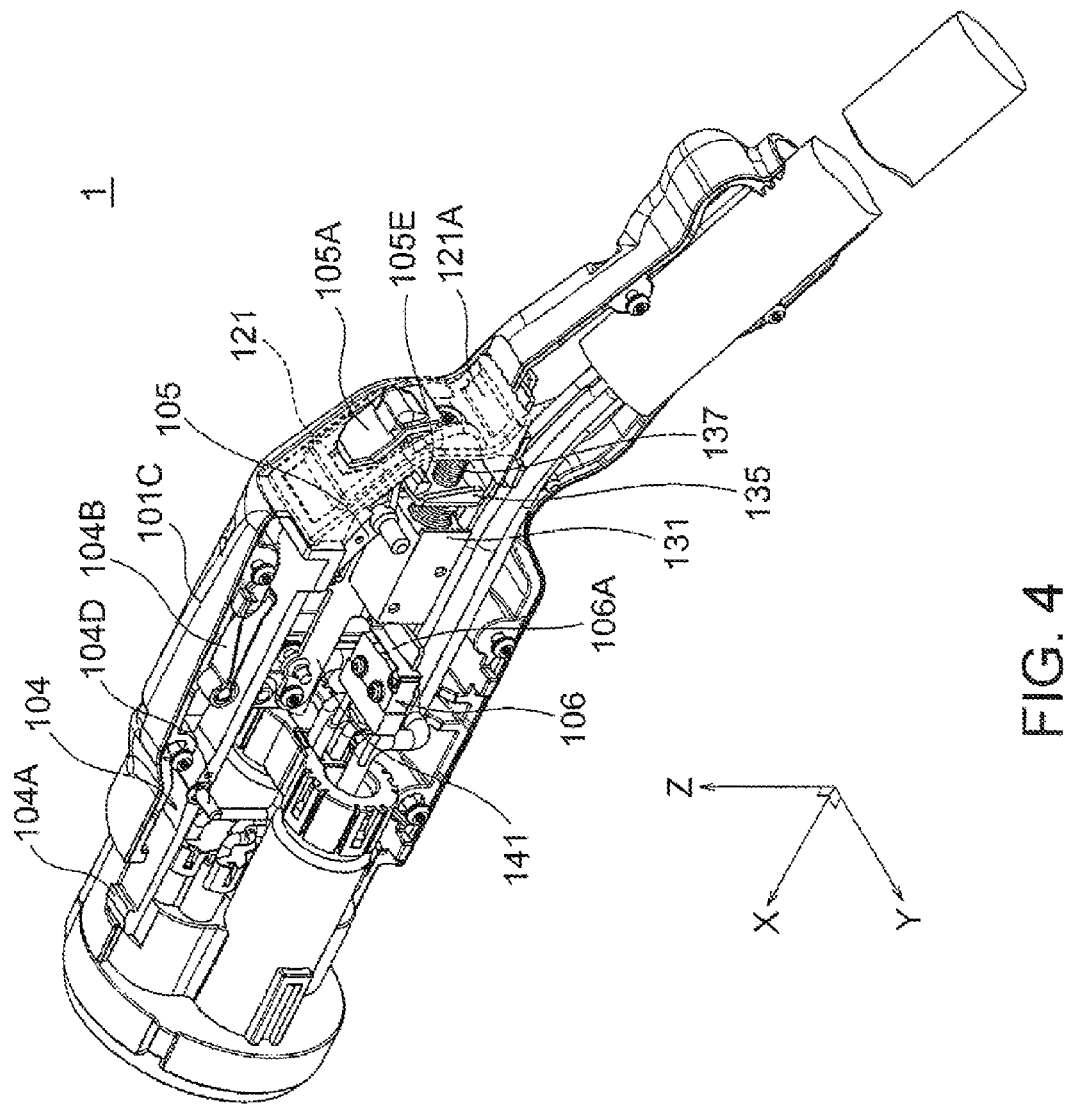
FIG. 4 is a perspective view (partially sectioned) in which the connector 1 is seen from an angle different from that in FIG. 1, wherein a cover 121 is illustrated in dotted line because of it being a transparent member.

As shown in FIGS. 3 and 4, the rotation shaft 1040 is fixed to an inner wall of the large-diameter portion 1010 of the outer shell 101 so as to face in a direction (herein Y-direction) crossing the axial direction of the outer shell 101.

The locking lever 104 has the claw-shaped locking portion 104A provided at its end in the X-direction positive direction.

In FIG. 2, the locking portion 104A is provided to project upward of the locking lever 104, i.e. to project in the Z-direction positive direction from the outer shell 101 of the connector 1, and has a claw shape for engagement with the inlet-side locking portion 202 of the inlet 2.

While the locking lever 104 is provided in the large-diameter portion 101C of the outer shell 101, at least the locking portion 104A is exposed to the outside.

More specifically, the locking portion 104A is exposed to the outside from an opening portion 101D provided at a connecting portion between the large-diameter portion 101C and the small-diameter portion 101B.

A portion, on the side opposite to the locking portion 104A with respect to the rotation shaft 104D, of the locking lever 104 forms an operating portion 104C that is brought into contact with the release lever 105. The operating portion 104C is provided in the large-diameter portion 101C.

Further, between the large-diameter portion 101C and the operating portion 104C, a V-shaped leaf spring 104B is provided on the Z-direction positive direction side of the operating portion 104C. The leaf spring 104B applies a torque to the locking lever 104 in a direction (direction A1 in FIG. 2) in which the locking portion 104A rotates outward of the connector 1.

On the other hand, a surface in the Z-direction positive direction (upper surface in FIG. 2), near the locking portion 104A, of the locking lever 104 is, when brought into contact with the opening portion 101D, prevented from further rotation in the direction A1.

As shown in FIG. 2, the release lever 105 has a shape in which a rod-shaped member is bent into a <-shape, and is disposed along the X-direction positive direction of the locking lever 104 such that projected planes in the Z-direction of the release lever 105 and the locking lever 104 partially overlap each other. The release lever 105 is provided to be rotatable in the same directions as the locking lever 104, i.e. the directions A1 and A2 in FIG. 2, by a rotation shaft 105C located at a bent portion of the release lever 105.

The rotation shaft 105C is fixed to an inner wall of the large-diameter portion 101C of the outer shell 101 so as to face in the Y-direction of the outer shell 101.

The release lever 105 is provided in the large-diameter portion 101C of the outer shell 101 and an end portion, on the side near the locking lever 104 of the release lever 105 forms a locking lever side end portion 105B that is brought into contact with the operating portion 1040 of the locking lever 104.

The locking lever side end portion 105B is provided to be contactable with a lower surface (surface on the Z-direction negative direction side) of the operating portion 104C.

Further, an end portion, on the side away from the locking lever 104 of the release lever 105 is exposed to the outside of the large-diameter portion 101C and forms the button-shaped release button 105A that can be pressed in the Z-direction negative direction, i.e. inward of the outer shell 101.

Specifically, the release button 105A is exposed to the outside from an opening portion 102A provided at an end in the X-direction negative direction of the large-diameter portion 101C.

Further, a projection 105E that abuts against the release restricting portion 135 is provided at an end in the Z-direction negative direction of the release button 105A. As shown in FIGS. 3 and 4, the projection 105E is a rod-shaped member extending in the Y-direction.

The rotation shaft 105C is provided with a torsion spring 105D. The torsion spring 105D applies a torque to the release lever 105 in a direction (direction A2 in FIG. 2) in which the locking lever side end portion 105B moves away from the operating portion 104C.

Figure 5:
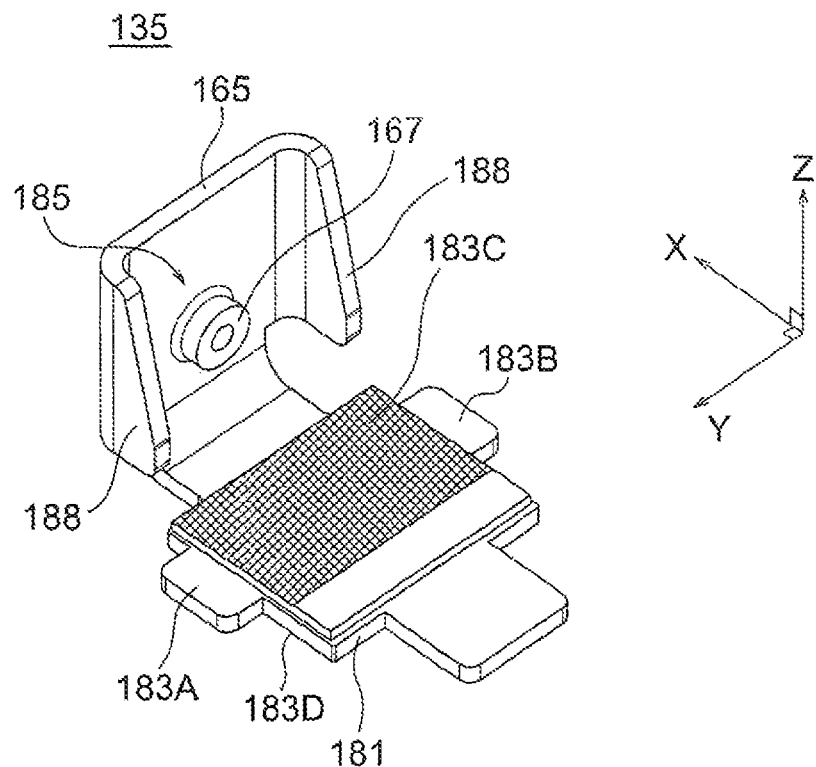
FIG. 5 is a perspective view of a release restricting portion 135.
Figure 6:
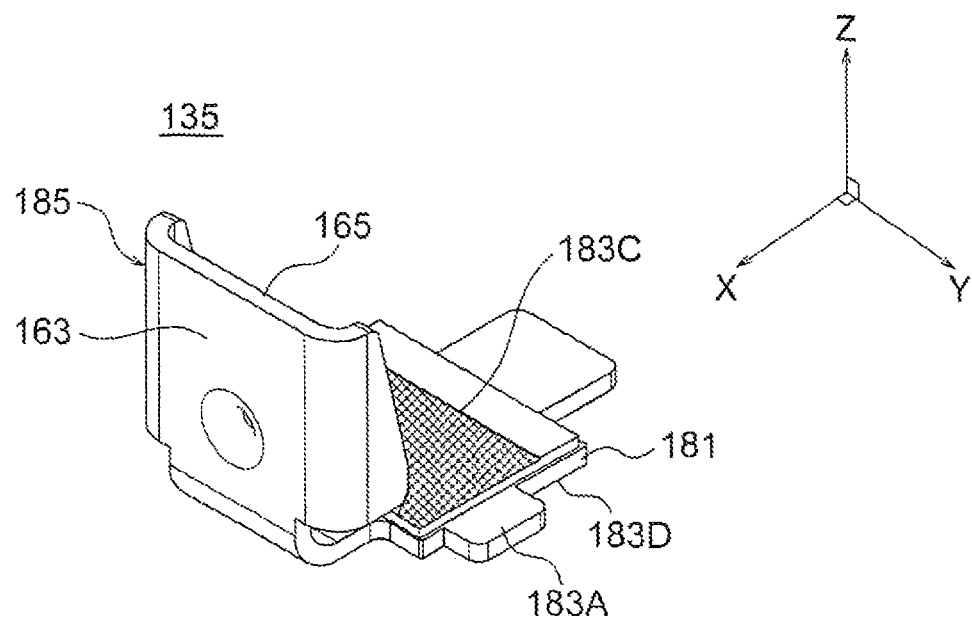
FIG. 6 is a perspective view in which the release restricting portion 135 is seen from an angle different from that in FIG. 5.

However, since the release button 105A is, when brought into contact with the opening portion 102A in the Z-direction positive direction, prevented from further movement in the Z-direction positive direction, there is no possibility of the release lever 105 to rotate in the direction A2 more than FIG. 2, The release restricting portion 135 is herein a plate member of an L-shape as seen in the Y-direction and, as shown in FIGS. 5 and 6, includes the slide portion 181 in which a bottom surface 183D of the L-shape is parallel to the X-direction positive direction and the X-direction negative direction. Herein, the slide portion 181 is a plate member whose normal direction is parallel to the Z-direction positive direction and the Z-direction negative direction.

Slide side portions 183A and 183B are provided on both sides in the Y-direction of the slide portion 181. The slide portion 181 (particularly the slide side portions 183A and 183B) is held by slide grooves 101E provided on an inner wall of the large-diameter portion 101C.

On the other hand, a surface on the 7-direction positive direction side of the slide portion 181 is provided such that at least a part thereof (herein a visual recognition portion 183C) is disposed at a position that is visible from the outside of (the large-diameter portion 101C of) the outer shell 101 in the state where the position of the slide portion 181 restricts the release of locking (operation of the locking lever 104) by the release button 105A (in the state where the release restricting portion 135 is located at the abutting position $P_L$).

Since the large-diameter portion 101C has a transparent cover 121 provided to cover the visual recognition portion 183C, even when the visual recognition portion 183C is disposed at the position visible from the outside of the large-diameter portion 101C, the visual recognition portion 183C is located within the cover 121 (see FIG. 4).

The release restricting portion 135 has the projecting portion 185 provided to project from the slide portion 181 toward the release button 105A.

The projecting portion 185 has an abutting surface 163 whose normal direction is parallel to the X-direction and which abuts against the plunger 131A.

Further, a free end on the release button 105A side, i.e. in the Z-direction positive direction, of the projecting portion 185, when brought into contact with the projection 105E of the release button 105A, serves as a restricting portion 165 that restricts the release of locking, i.e. an operation of the locking lever 104, by the release button 105A.

The projecting portion 185 has side portions 188 projecting in the X-direction negative direction from its both sides in the Y-direction so that the restricting portion 165 has a ]-shape as seen in the Z-direction negative direction (planar shape is ]). In this way, by configuring the planar shape of the restricting portion 165 to be ], it is possible to increase the area of abutment with the projection 105E.

Figure 7:
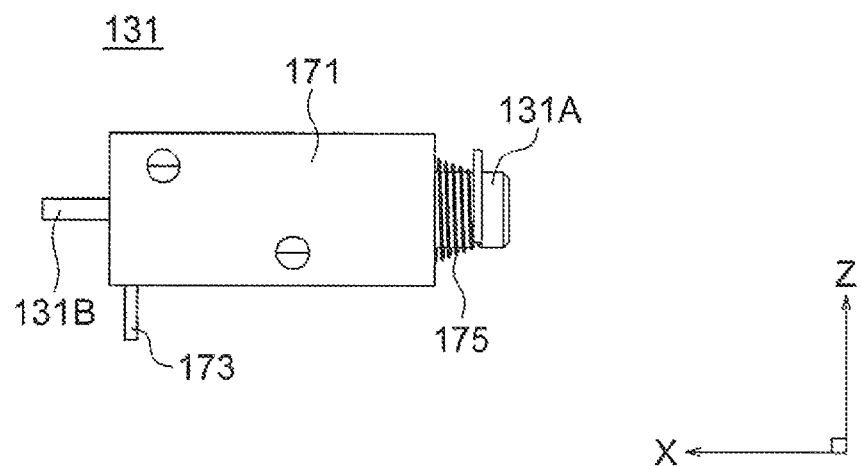
FIG. 7 is an enlarged view of a solenoid 131.
Figure 8:
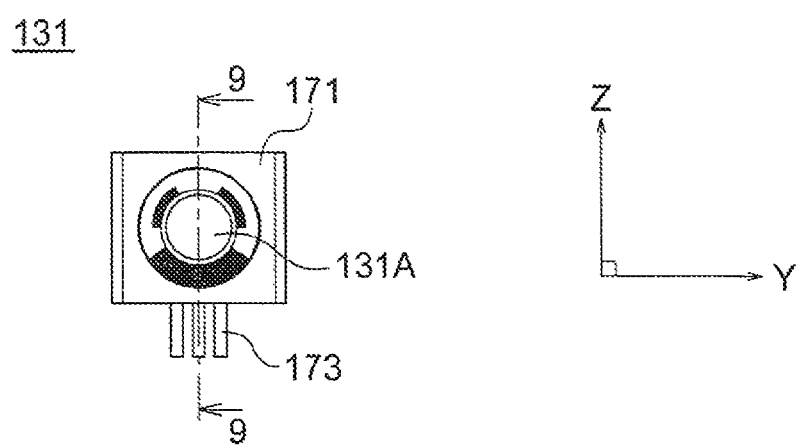
FIG. 8 is a view in which the solenoid 131 is seen in an X-direction positive direction in FIG. 7.
Figure 9:
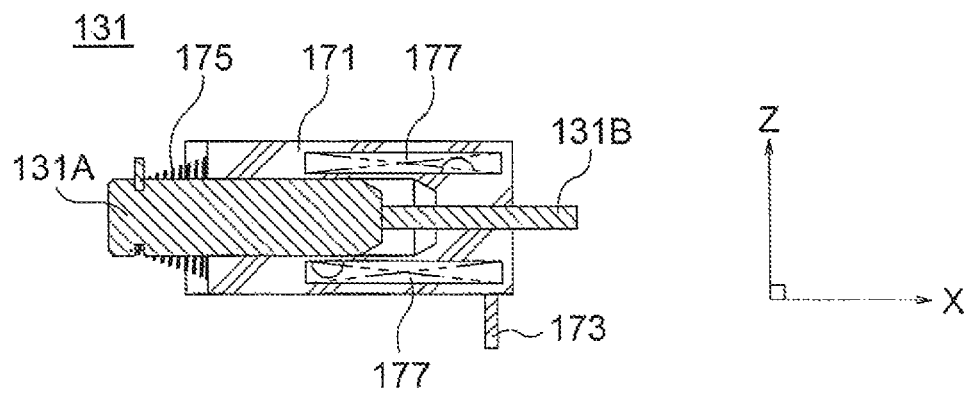
FIG. 9 is a 9-9 sectional view of FIG. 8.

As shown in FIGS. 7 to 9, the solenoid 131 includes a body 171, the plunger 131A received in the body 171, projecting in the X-direction negative direction, and configured to move in the X-direction positive direction and the X-direction negative direction, a solenoid coil 177 that drives the plunger 131A, a solenoid spring 175 provided to connect between the plunger 131A and the body 171, a fixing portion 173 provided to the body 171 so as to project in the Z-direction negative direction for fixing the body 171 to a fixing plate 141 (see FIG. 2), and a guide bar 131B provided integrally with the plunger 131A, projecting in a direction (X-direction positive direction) opposite to the plunger 131A, and configured to move integrally with the plunger 131A in the X-direction positive direction and the X-direction negative direction.

Further, as shown in FIG. 2, the connector 1 includes a switch 106 that is provided to be able to be pressed (operated) with the guide bar 131B and, when pressed with the guide bar 131B, produces information indicating a position of the plunger 131A of the solenoid 131 in a pressed state.

The switch 106 herein has a spring piece 106A (see FIG. 4). In the state where the spring piece 106A is not pressed (not operated), internal contacts (not shown) of the switch 106 are closed, while, when the spring piece 106A is pressed, the internal contacts (not shown) are opened.

The fixing plate 141 as a holding portion holding the solenoid 131 and the switch 106 is provided on an inner side surface, as seen from the Y-direction positive direction side to the Y-direction negative direction side, of the large-diameter portion 101C of the connector 1.

The coil spring 137 has one end held on a boss-shaped spring holding portion 167 (see FIG. 5) provided on a surface on the opposite side of the abutting surface 163 of the projecting portion 185 of the release restricting portion 135 and the other end disposed in a recess 101F (see FIG. 10) provided at an end in the X-direction negative direction of the large-diameter portion 101C and constantly presses the release restricting portion 135 toward the solenoid 131 (i.e. in the X-direction positive direction).

The above is the detailed description of the structures of the connector 1 and the inlet 2.

Herein, the restriction of the movement of the release button 105A by the release restricting portion 135 will be briefly described with reference to FIGS. 10 to 12.

Figure 10:
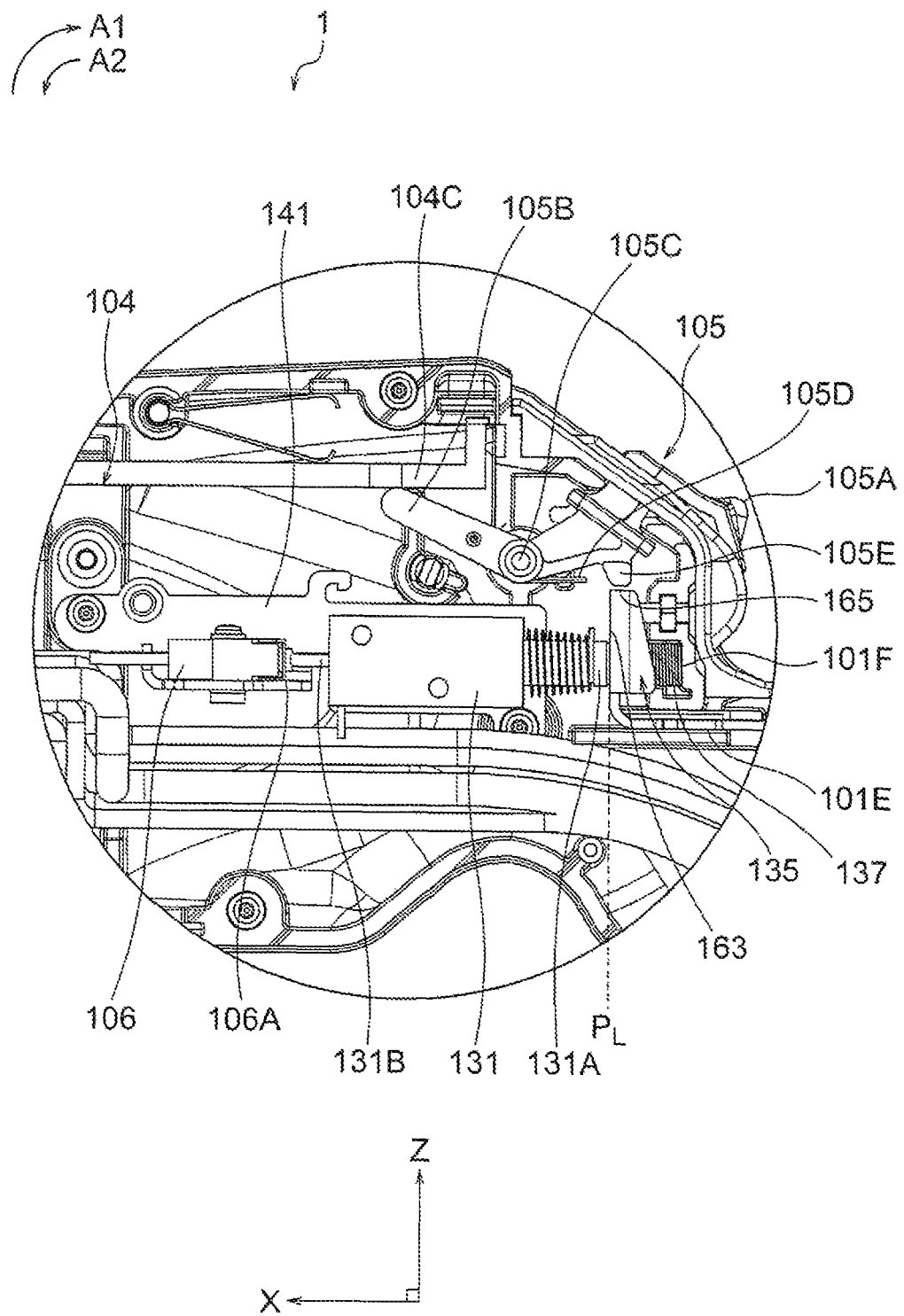
FIG. 10 is an enlarged view around the solenoid 131 of FIG. 2, showing a case where the release restricting portion 135 is located at an abutting position $P_L$.

First, as shown in FIG. 10, in the state where the restricting portion 165 of the release restricting portion 135 faces the projection 105E of the release button 105A in the Z-direction, even when the release button 105A of the release lever 105 is pressed in the Z-direction negative direction, since the projection 105E abuts against the restricting portion 165, the release button 105A cannot move in the Z-direction negative direction so that the release lever 105 cannot rotate. Therefore, in this state, the release restricting portion 135 restricts the movement of the release button 105A. Herein, the position in the X-direction of the release restricting portion 135 in this state is called the abutting position $P_L$.

Figure 11:
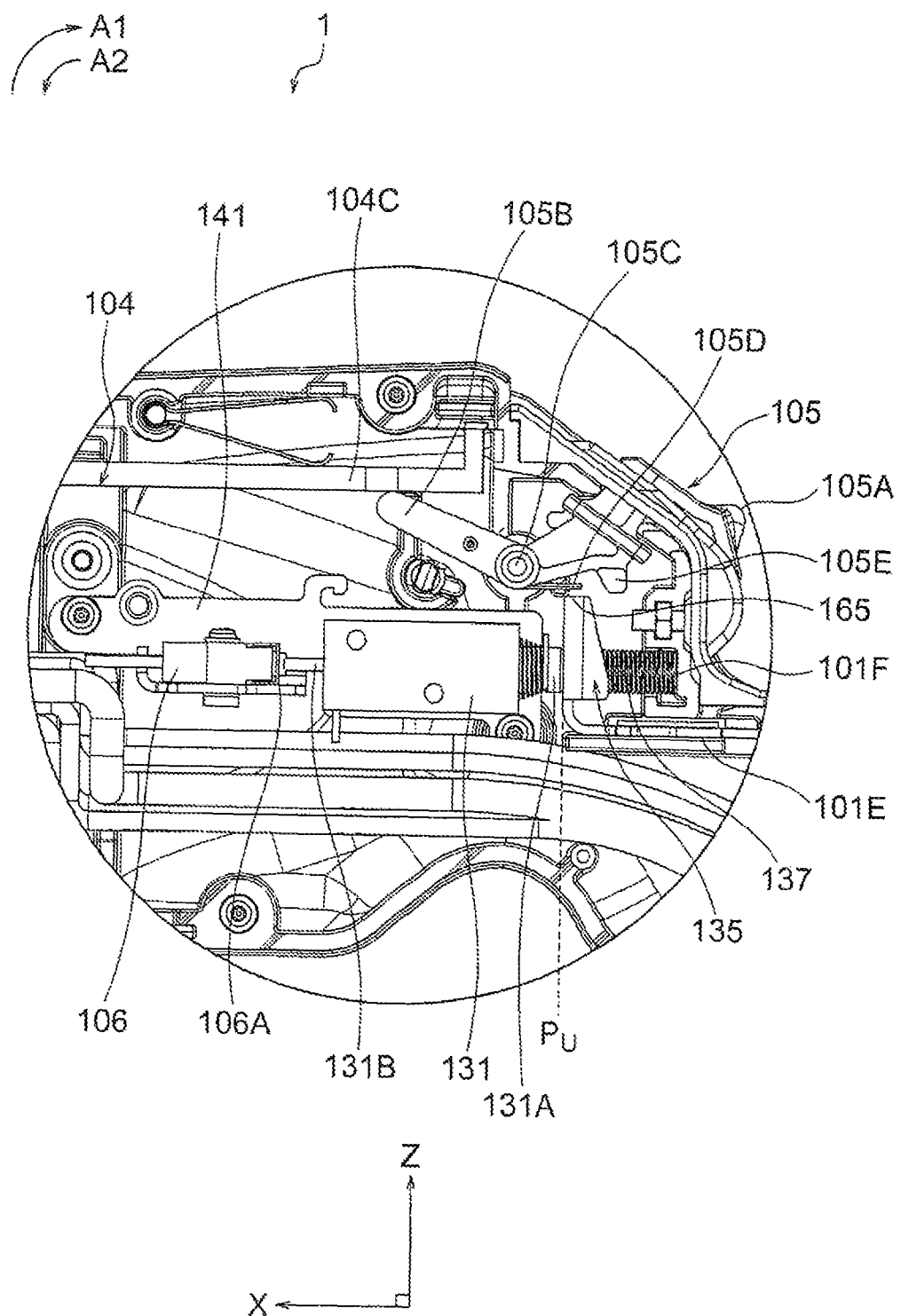
FIG. 11 is an enlarged view around the solenoid 131 of FIG. 2, showing a case where the release restricting portion 135 is located at a release position $P_U$.

On the other hand, as shown in FIG. 11 (and by broken line in FIG. 12), in the state where the restricting portion 165 of the release restricting portion 135 does not face the projection 105E of the release button 105A in the Z-direction, when the release button 105A of the release lever 105 is pressed in the Z-direction negative direction, since the projection 105E does not abut against the restricting portion 165, the release button 105A can move in the Z-direction negative direction so that the release lever 105 can rotate. Therefore, in this state, the release restricting portion 135 does not restrict the movement of the release button 105A. Herein, the position in the X-direction of the release restricting portion 135 in this state is called a release position P.

In this way, in the connector 1, the position in the X-direction of the release restricting portion 135 determines whether or not the release restricting portion 135 restricts the movement of the release button 105A.

The release restricting portion 135 can move in the X-direction negative direction by being pressed by the plunger 131A of the solenoid 131. On the other hand, since the release restricting portion 135 is not fixed to the plunger 131A, even when the plunger 131A moves in the X-direction positive direction, the release restricting portion 135 cannot move following the plunger 131A.

However, since the release restricting portion 135 is pressed by the coil spring 137 in the X-direction positive direction, when the plunger 131A moves in the X-direction positive direction, the release restricting portion 135 moves in the X-direction positive direction by being pressed by the coil spring 137.

In this way, in the connector 1, the release restricting portion 135 is in contact (in abutment) with the plunger 131A, but is not fixed to the plunger 131A. Therefore, even when the projection 105E of the release button 105A abuts against the restricting portion 165 of the release restricting portion 135 at the abutting position $P_L$, a force that is applied to the release restricting portion 135 in the Z-direction negative direction from the release button 105A is transmitted directly to the projecting portion 185 and the slide portion 181 but is hardly transmitted to the plunger 131A.

Therefore, in the connector 1, even when the release button 105A is forcibly pressed in the Z-direction negative direction in the state where the release restricting portion 135 is located at the abutting position $P_L$, the solenoid 131 hardly fails.

The above is the description of the restriction of the movement of the release button 105A by the release restricting portion 135.

Next, the movements/operations of the locking lever 104 the release button 105A (the release lever 105), the release restricting portion 135, the solenoid 131, the coil spring 137, and the switch 106 at the time of fitting (charging) of the connector unit 200 will be described with reference to FIGS. 2 and 13 to 17.

First, in the state before starting fitting, i.e. in the state where the connector 1 and the inlet 2 are not at all in contact with each other, the locking to lever 104, the release lever 105, the release restricting portion 135, the solenoid 131, the coil spring 137, and the switch 106 are in the state shown in FIG. 2.

Specifically, the locking lever side end portion 105B of the release lever 105 is not pressing the operating portion 104C of the locking lever 104.

The locking lever 104 and the release lever 105 are respectively held at the positions in FIG. 2 by the leaf spring 104B and the torsion spring 105D.

More specifically, while the locking lever 104 is given a torque in the direction A1 by the leaf spring 104B, since the locking lever 104 is in abutment with the opening portion 101D in the state of FIG. 2, the locking lever 104 is supported at two positions of the rotation shaft 1040 and the opening portion 101D and held in this state.

On the other hand, while the release lever 105 is given a torque in the direction A2 by the torsion spring 105D, since the release button 105A is in abutment with the opening portion 102A, the release lever 105 is supported at two positions of the rotation shaft 105C and the opening portion 102A and held in this state.

Figure 12:
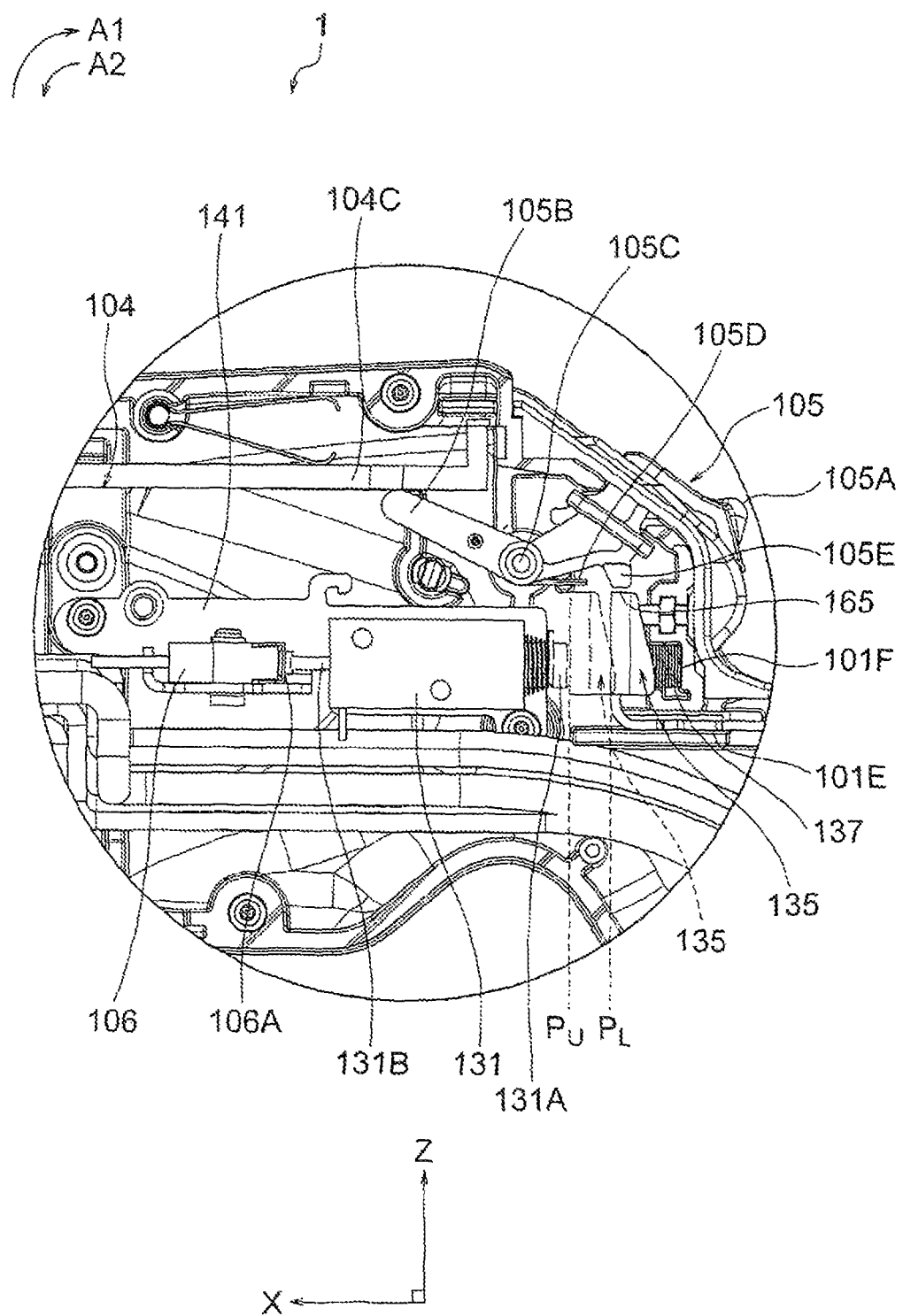
FIG. 12 is an enlarged view around the solenoid 131 of FIG. 2, wherein the case where the release restricting portion 135 is located at the abutting position $P_L$ is illustrated in solid line and the case where the release restricting portion 135 is located at the release position $P_U$ is illustrated in broken line.

Further, the release restricting portion 135 is located at the release position $P_U$ (see FIG. 12). Therefore, the release restricting portion 135 does not restrict the movement of the release button 105A.

Further, since the spring piece 106A (see FIG. 4) of the switch 106 is pressed by the guide bar 131B, the switch 106 is opened. Accordingly, a detection circuit of a battery charger (not shown) connected to the switch 106 via the cable 109 can recognize, due to the circuit being opened, that the release restricting portion 135 is located at the release position $P_U$. Herein, information that is produced by the switch 106 due to opening of the switch 106 (information indicating opening of the switch 106, more specifically, information indicating that the plunger 131A is located at a position that opens the switch 106) is also called first information.

Then, from the state shown in FIG. 2, the small-diameter portion 101B of the outer shell 101 of the connector 1 is inserted into the housing 201 of the inlet 2.

Specifically, holding the grip 102 of the connector, the operator inserts the small-diameter portion 101B of the outer shell 101 into the housing 201 of the inlet 2 using the front end 10M as a guide.

Figure 13:
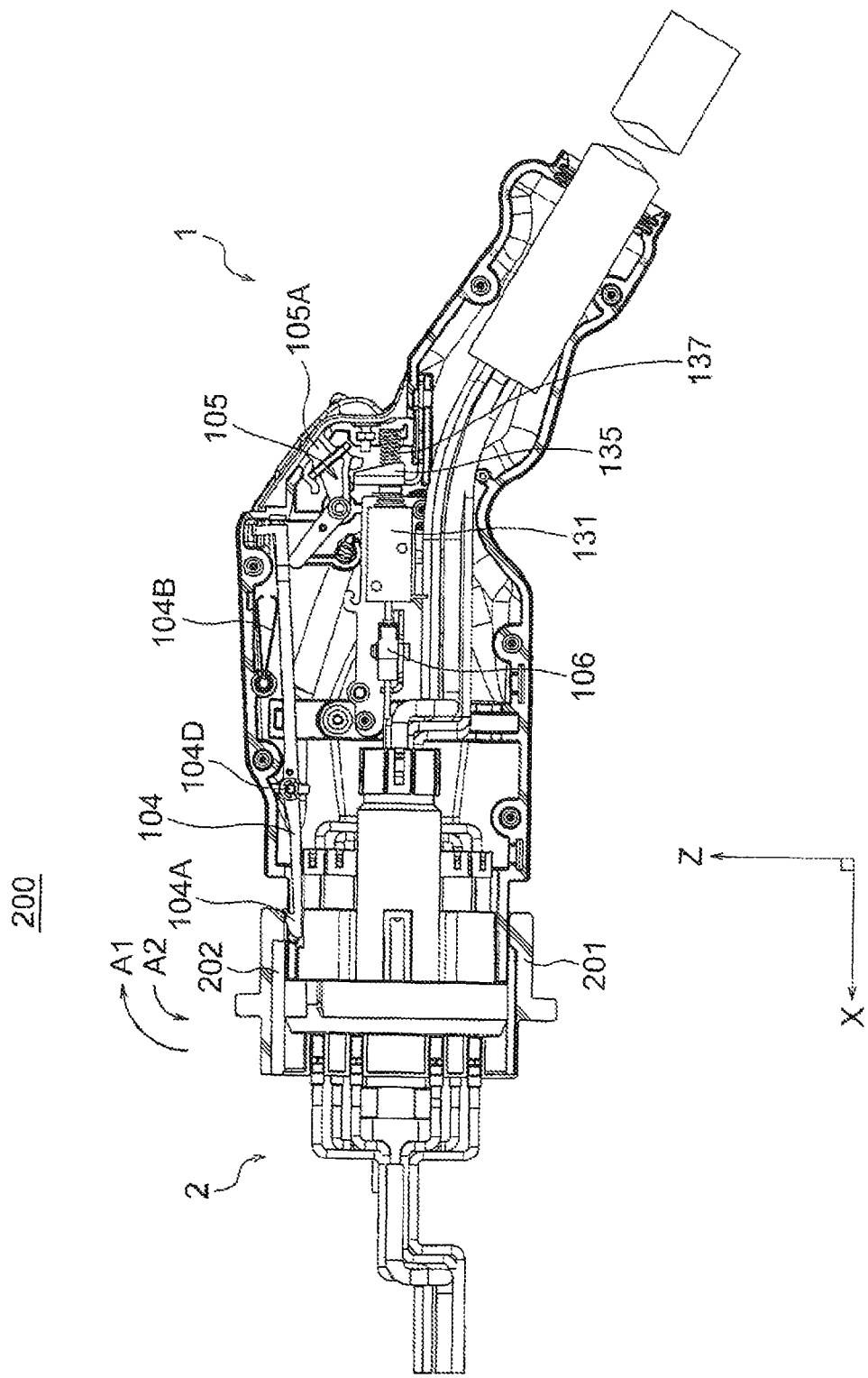
FIG. 13 is a side view (partially sectioned) for explaining the movements/operations of a locking lever 104, a release button 105A (a release lever 105), the release restricting portion 135, the solenoid 131, a coil spring 137, to and a switch 106 in process of fitting of the connector unit 200.

Then, as shown in FIG. 13, the locking portion 104A of the locking lever 104 is brought into contact with an inner wall of the housing 201 and rotates in the direction A2 centering around the rotation shaft 104D against an elastic force of the leaf spring 104B so as to be depressed in the Z-direction negative direction.

This state is a halfway fitted state.

In this state, while a great part of the inner housing 103 (the small-diameter portion 101B) of the connector 1 is located in the housing 201 of the inlet 2, the contacts 108 of the connector 1 are only in contact with the contacts 203 of the inlet 2 and are not locked and not completely fitted thereto.

Figure 14:
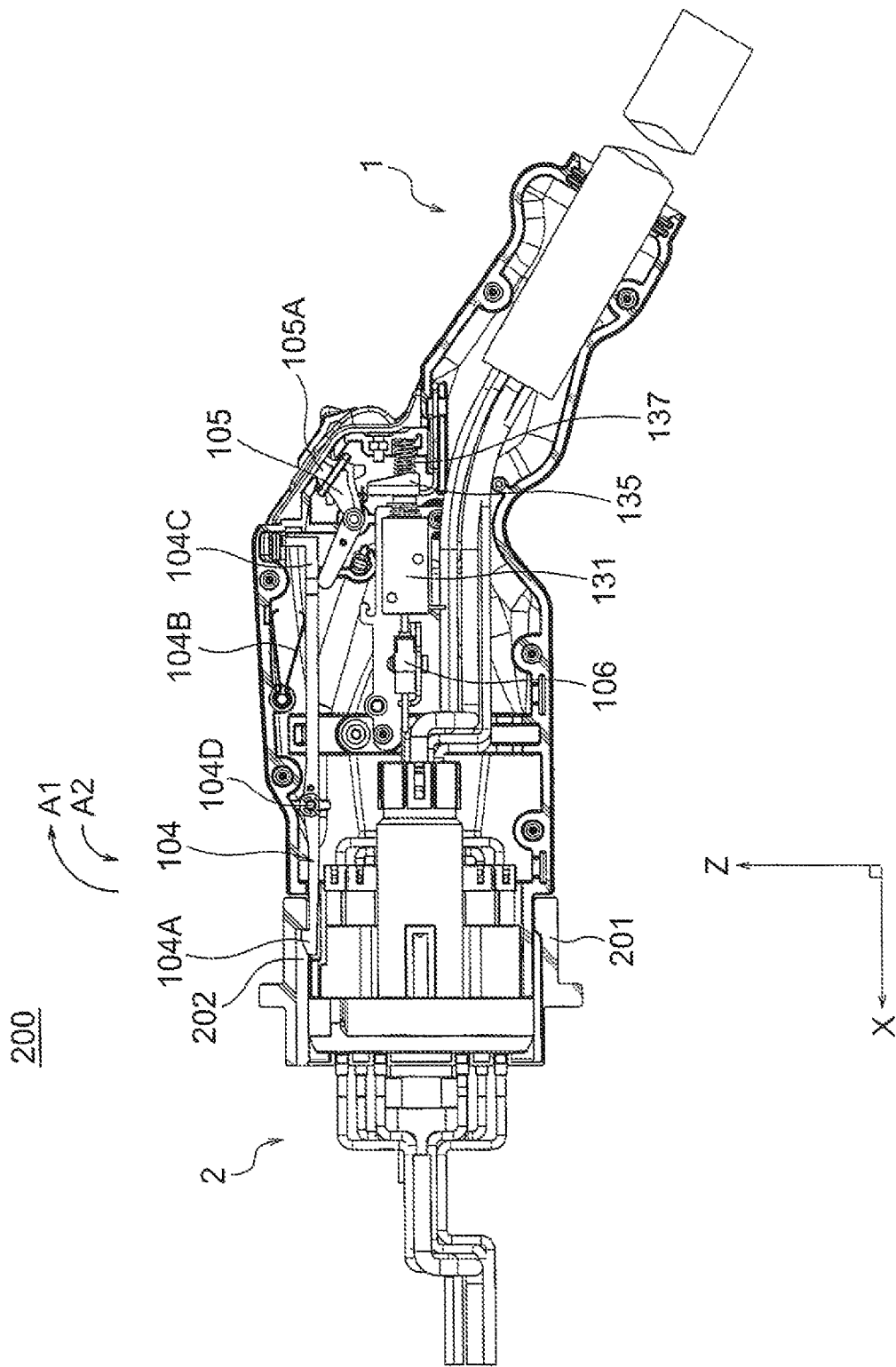
FIG. 14 is a side view (partially sectioned) for explaining the movements/operations of the locking lever 104, the release button 105A (the release lever 105), the release restricting portion 135, the solenoid 131, the coil spring 137, and the switch 106 in process of fitting of the connector unit 200.

Then, when the connector 1 is further inserted from the state of FIG. 13 so that the locking portion 104A gets over the inner wall of the housing 201 to reach the inlet-side locking portion 202, the locking lever 104 rotates in the direction A1 by the elastic force of the leaf spring 104B so that the locking portion 104A engages with the inlet-side locking portion 202 as shown in FIG. 14.

In this state, the connector 1 is fitted to the inlet 2 and the contacts 108 and the contacts 203 are electrically connected to each other so that charging is enabled.

On the other hand, since an operation of the release button 105A is enabled in this state, if charging is started in this state, when the release button 105A is operated in error, there is a possibility that the locking by the locking lever 104 is released to cause coming-off of the connector 1 from the inlet 2 to during the charging.

Therefore, in the state where the connector 1 is fitted to the inlet 2, and before the charging is started, the solenoid 131 drives the plunger 131A in the X-direction negative direction against an elastic force of the coil spring 137 to move the release restricting portion 135 to the abutting position $P_L$ (see FIG. 12).

Figure 15:
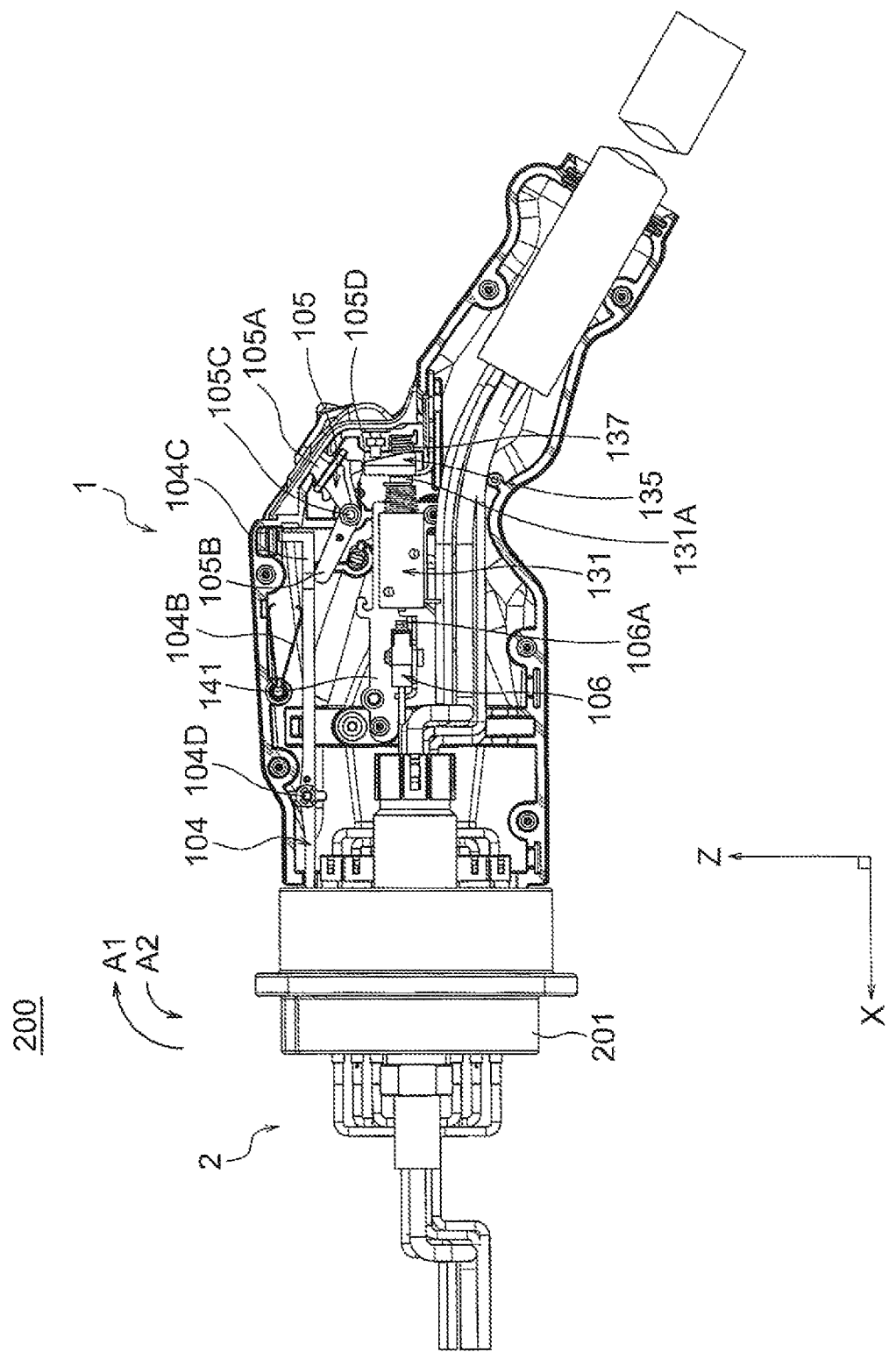
FIG. 15 is a side view (partially sectioned) for explaining the movements/operations of the locking lever 104, the release button 105A (the release lever 105), the release restricting portion 135, the solenoid 131, the coil spring 137, and the switch 106 in process of fitting of the connector unit 200.

Consequently, since an operation of the release button 105A is restricted by the release restricting portion 135 as shown in FIG. 15, the locking lever 104 does not move from the state of FIG. 15 so that there is no possibility of coming-off of the connector 1 from the inlet 2 during the charging.

In this state, the guide bar 131B does not press the spring piece 106A of the switch 106. Therefore, the switch 106 is in a closed state. Accordingly, the detection circuit of the battery charger (not shown) connected to the switch 106 via the cable 109 can recognize, due to the circuit being closed, that the release restricting portion 135 is located at the abutting position $P_L$. Herein, information that is produced by the switch 106 due to closing of the switch 106 (information indicating closing of the switch 106, more specifically, information indicating that the plunger 131A is located at a position that closes the switch 106) is also called second information.

In this way, in the connector 1, the switch 106 produces the information indicating the position of the plunger 131A of the solenoid 131 in response to the position of the plunger 131A.

Therefore, the control of charging using the information indicating the position of the plunger 131A can be achieved. For example, if the battery charger is controlled such that charging is enabled only when the release restricting portion 135 is located at the abutting position $P_L$, it is possible to surely prevent electric leakage due to coming-off of the connector 1 during the charging.

Since the switch 106 is provided on the side opposite to the side where the plunger 131A is provided, it is possible to arrange the switch 106 without being affected by the structure of the release restricting portion 135.

Further, since, in the state of FIG. 15, the visual recognition portion 183C (see FIG. 5) of the release restricting portion 135 is disposed at the position that is visible from the outside of the large-diameter portion 101C, the operator can visually recognize, through a visual recognition window 121A (see FIG. 4) of the transparent cover 121, that the release restricting portion 135 is located at the abutting position $P_L$.

Therefore, even if an impact is applied to the connector 1 due to, for example, dropping of the connector 1 by the operator in error so that the release button 105A does not move, the operator can easily know whether it is caused by failure of the release button 105A (or the release lever 105) itself or by the movement of the release restricting portion 135 to the abutting position $P_L$ due to the shock.

Since the visual recognition portion 183C is covered by the cover 121 even in the state where the visual recognition portion 183C is disposed at the position that is visible from the outside of the large-diameter portion 101C, there is no possibility that dust or the like enters the inside of the large-diameter portion 101C from the outside. In order for the operator to facilitate visual recognition, the visual recognition portion 183C may be painted in color.

Since the switch 106 and the solenoid 131 are fixed to the same member (the fixing plate 141), even if an impact is applied to the connector 1 due to, for example, dropping of the connector 1 by the operator in error, this is advantageous in that their relative positions hardly change.

Upon the completion of the charging, the solenoid 131 drives the plunger 131A in the X-direction positive direction.

Then, being pressed by the coil spring 137, the release restricting portion 135 moves from the abutting position $P_L$ to the release position $P_U$ (see to FIG. 12).

Consequently, an operation of the locking lever 104 is not restricted by the release restricting portion 135.

Since the spring piece 106A of the switch 106 is pressed by the guide bar 131B, the switch 106 is opened. Accordingly, the detection circuit of the battery charger (not shown) connected to the switch 106 via the cable 109 can recognize, due to the circuit being opened, that the release restricting portion 135 is located at the release position $P_U$.

Then, the operator presses the release button 105A of the release lever 105 in the Z-direction negative direction.

Figure 16:
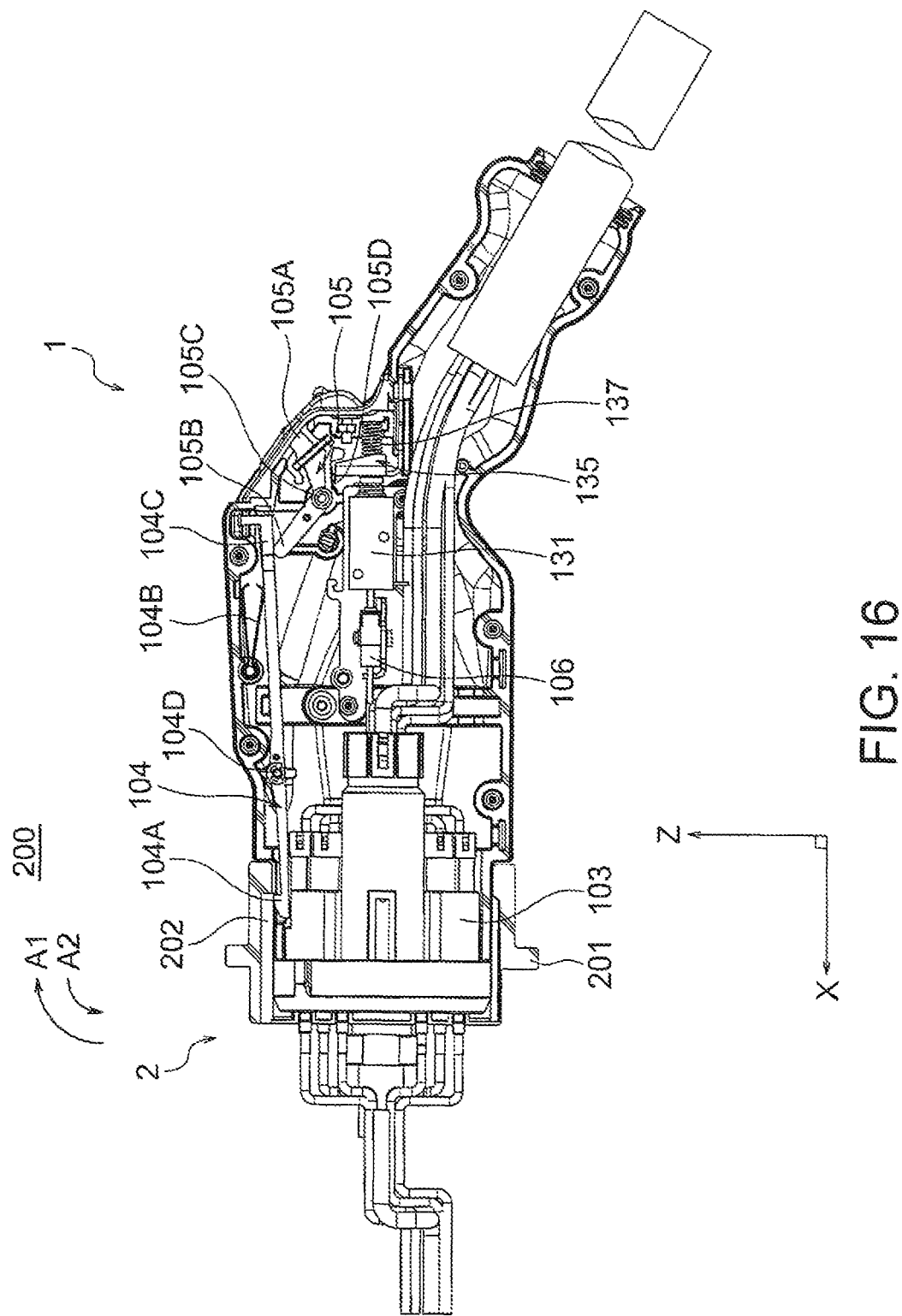
FIG. 16 is a side view (partially sectioned) for explaining the movements/operations of the locking lever 104, the release button 105A (the release lever 105), the release restricting portion 135, the solenoid 131, the coil spring 137, and the switch 106 in process of pulling-out of the connector unit 200.

Then, as shown in FIG. 16, the release lever 105 rotates in the direction A1 centering around the rotation shaft 105C against an elastic force of the torsion spring 105D so that the locking lever side end portion 105B is brought into contact with the operating portion 104C and presses the operating portion 104C in the Z-direction positive direction.

When the operating portion 104C is pressed in the Z-direction positive direction, the locking lever 104 rotates in the direction A2 centering around the rotation shaft 104D against the elastic force of the leaf spring 104B so that the locking portion 104A is depressed in the Z-direction negative direction.

Further, the locking portion 104A depressed in the Z-direction negative direction is separated from the inlet-side locking portion 202 so that the locking portion 104A and the inlet-side looking portion 202 are out of contact with each other.

Figure 17:
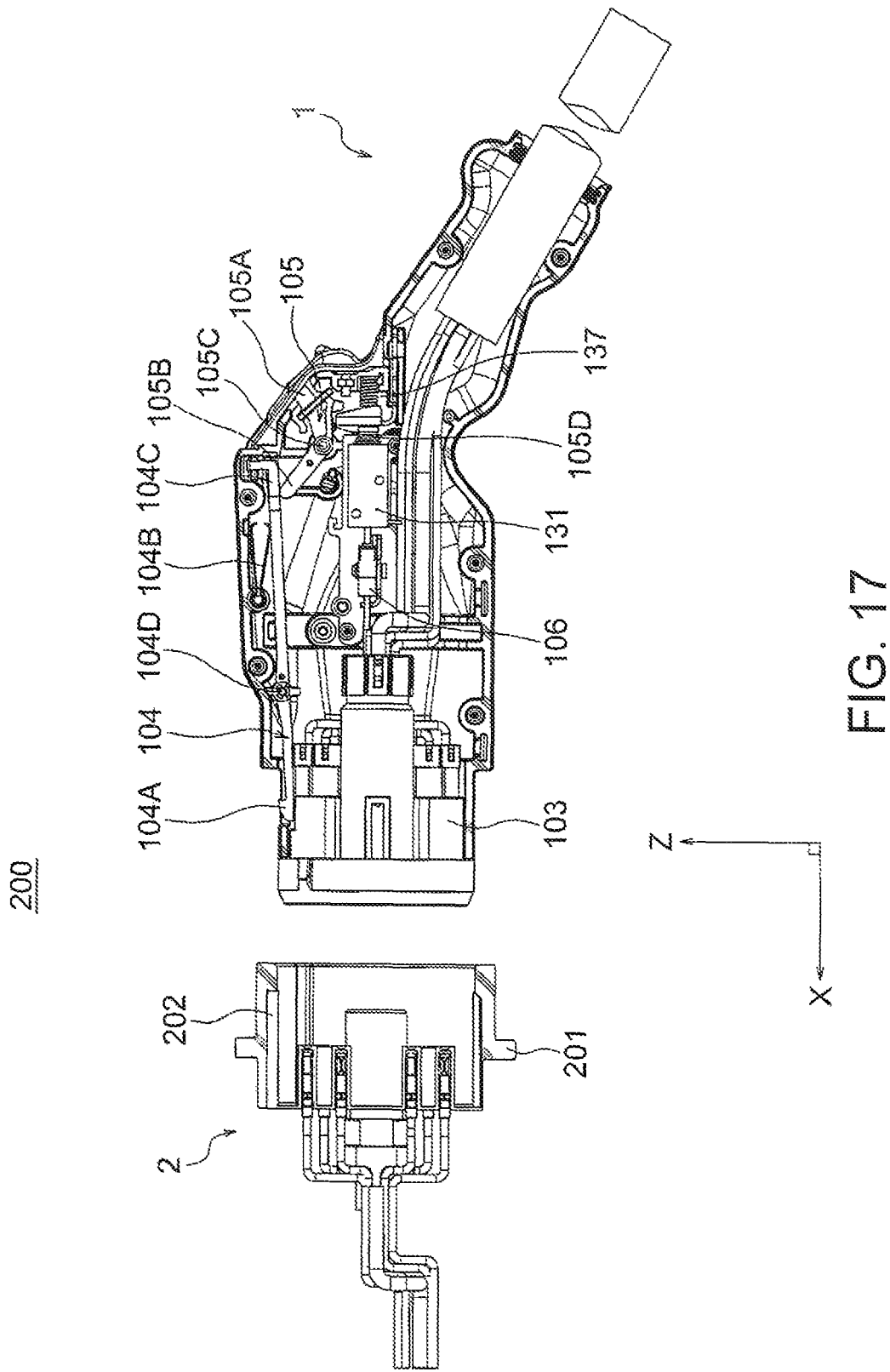
FIG. 17 is a side view (partially sectioned) for explaining the movements/operations of the locking lever 104, the release button 105A (the release lever 105), the release restricting portion 135, the solenoid 131, the coil spring 137, and the switch 106 in process of pulling-out of the connector unit 200.

In this state, since the fitted state between the connector 1 and the inlet 2 is not locked, it is possible to pull out the connector 1 from the inlet 2 as shown in FIG. 17.

Upon pulling out the connector 1 from the inlet 2 and releasing the pressing of the release lever 105, the locking lever 104 and the release lever 105 lo respectively rotate in the directions A1 and A2 due to the elastic forces of the leaf spring 104B and the torsion spring 105D and return to the states before the fitting shown in FIG. 2.

The above is the description of the movements/operations of the locking lever 104, the release button 105A (the release lever 105), the release restricting portion 135, the solenoid 131, the coil spring 137, and the switch 106 at the time of fitting (charging) of the connector unit 200.

As described above, according to the first embodiment, the connector 1 includes the locking lever 104 that is rotatable and locks the fitted state with the inlet 2, and the release lever 105 having the release button 105A as the release portion that is provided to be movable in the 1-direction negative direction as the first direction and in the Z-direction positive direction as the second direction parallel and opposite to the first direction and rotates the locking lever 104 by moving in the Z-direction negative direction to release the locking. The connector 1 further includes the release restricting portion 135 that is provided to be movable in the X-direction negative direction as the third direction crossing the Z-direction positive and negative directions and in the X-direction positive direction as the fourth direction parallel and opposite to the X-direction negative direction and to be movable to the abutting position $P_L$ which is the position where the release restricting portion 135, in its movable range, abuts against the release button 105A moving in the Z-direction negative direction, thereby restricting the movement in the Z-direction negative direction of the release button 105A at the abutting position $P_L$ to restrict the release of the locking. The connector 1 further includes the solenoid 131 as the moving portion that moves the release restricting portion 135 in the X-direction negative direction, and the coil spring 137 as the pressing portion that presses the release restricting portion 135 in the X-direction positive direction which is the direction approaching the solenoid 131. The solenoid 131 includes the plunger 131A that moves in the X-direction positive direction and the X-direction negative direction. The release restricting portion 135 includes the slide portion 181 movable in the X-direction positive direction and the X-direction negative direction and the projecting portion 185 as the contact portion which is provided to the slide portion 181 and restricts the movement of the release button 105A by abutting against the release button 105A and against which the plunger 131A abuts.

Therefore, even when the connector 1 has the structure configured to restrict the movement of the release portion (the release button 105A) using the solenoid 131, the solenoid 131 is tougher to fail than conventional.

Next, a first modification of the first embodiment will be described with reference to FIGS. 18 and 19.

The first modification is such that, in the first embodiment, guide portions 301 are provided to a release restricting portion 135.

Figure 18:
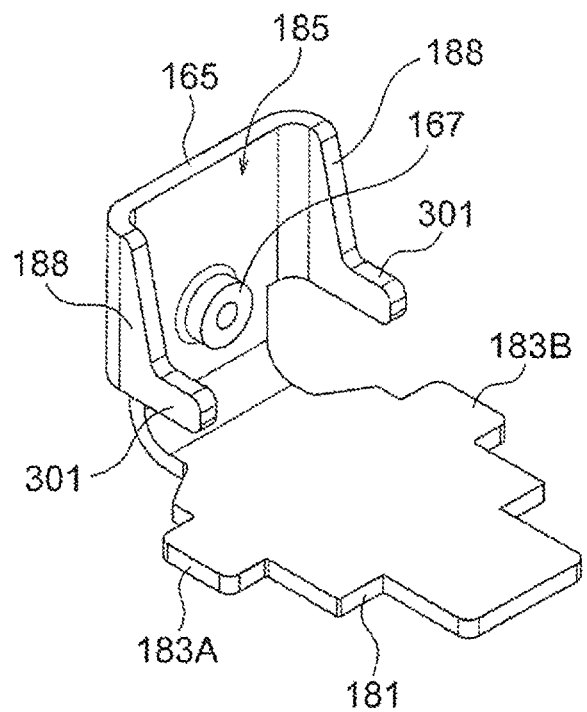
FIG. 18 is a perspective view showing a release restricting portion 135 of a first modification.
Figure 18:
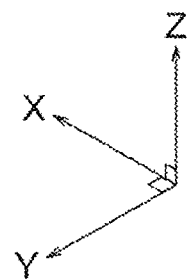

As shown in FIG. 18, the release restricting portion 135 of the first modification has the guide portions 301 projecting in the X-direction negative direction from side portions 188 of a projecting portion 185.

Figure 19:
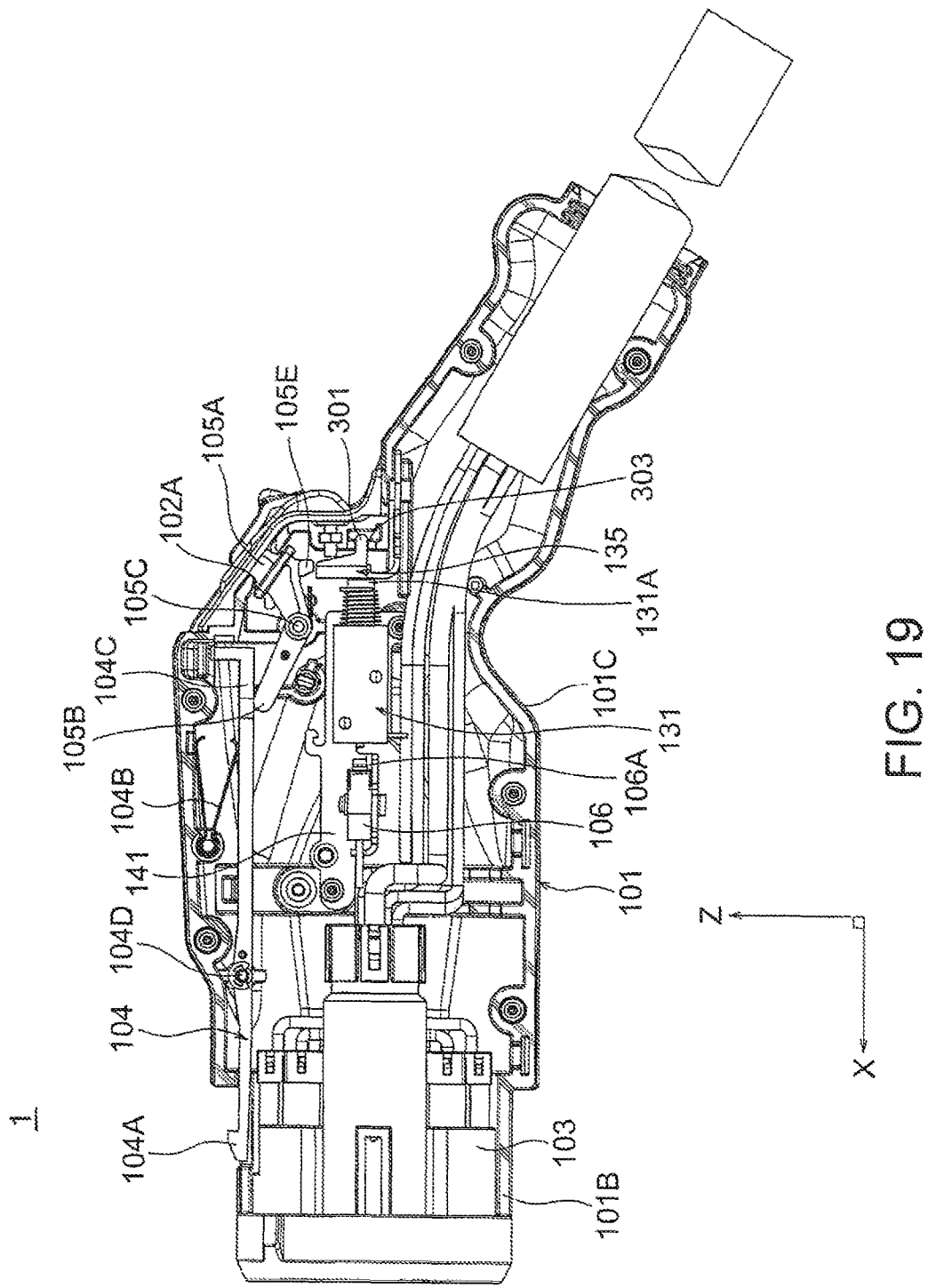
FIG. 19 is a side view (partially sectioned) showing a connector 1 of the first modification.

Further, as shown in FIG. 19, a large-diameter portion 101C of a connector 1 has guide portion recesses 303 which face the guide portions 301 and into which the guide portions 301 are inserted.

In this structure, as shown in FIG. 19, when the release restricting portion 135 is located at the abutting position $P_L$, the guide portions 301 are inserted into the guide portion recesses 303.

Therefore, when a force is applied to the release restricting portion 135 in the Z-direction negative direction due to, for example, a forcible operation of a release button 105A in this state, the force is dispersed not only to the projecting portion 185 and a slide portion 181, but also to the guide portions 301.

Therefore, it is possible to further enhance the strength of the release restricting portion 135.

In the first modification, the structure of the connector 1 other than the guide portions 301 and the guide portion recesses 303 is the same as in the first embodiment and therefore a description thereof is omitted.

Next, a second modification of the first embodiment will be described with reference to FIGS. 20 and 21.

The second modification is such that, in the first embodiment, the shape of a restricting portion 165 of a release restricting portion 135 is a plate shape whose normal direction is parallel to the first direction and the second direction (Z-direction negative direction and Z-direction positive direction) and which projects to the plunger 131A side. The other structure is the same as in the first embodiment and therefore a description thereof is omitted.

Figure 20:
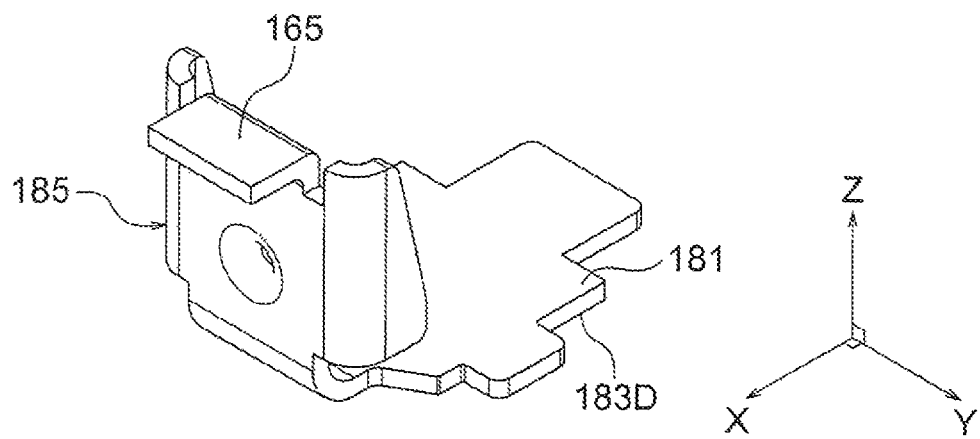
FIG. 20 is a perspective view showing a release restricting portion 135 of a second modification.
Figure 21:
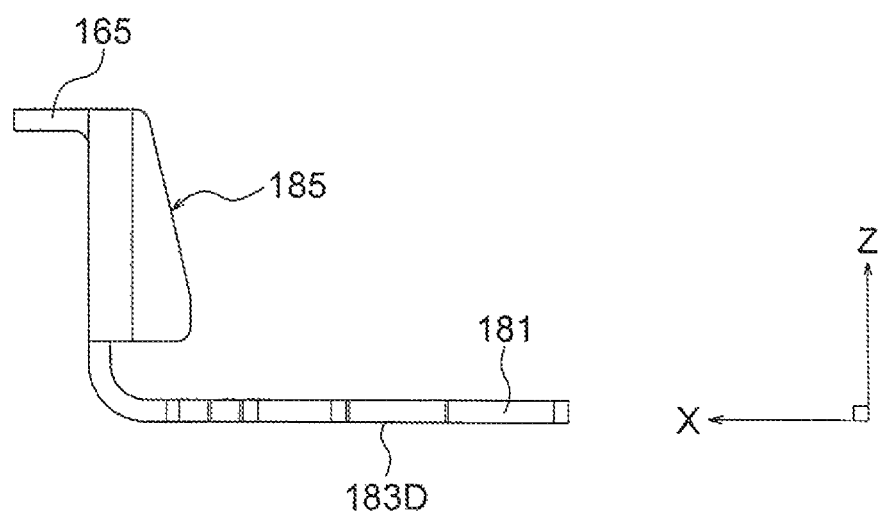
FIG. 21 is a side view showing the release restricting portion 135 of the second modification.

As shown in FIGS. 20 and 21, the shape of the restricting portion 165 of the release restricting portion 135 of the second modification is the plate shape whose normal direction is parallel to the Z-direction negative direction and the Z-direction positive direction and which projects to the plunger 131A side (X-direction positive direction side).

By configuring the restricting portion 165 to have such a shape, the area of the restricting portion 165 for abutment with a projection 105E of a release button 105A can be increased compared to the first embodiment.

Next a third modification of the first embodiment will be described with reference to FIGS, 22 and 23.

The third modification is such that, in the first embodiment, the shape of a restricting portion 165 of a release restricting portion 135 is a plate shape whose normal direction is parallel to the first direction and the second direction (Z-direction negative direction and Z-direction positive direction) and which projects to the opposite side of the plunger 131A side. The other structure is the same as in the first embodiment and therefore a description thereof is omitted.

Figure 22:
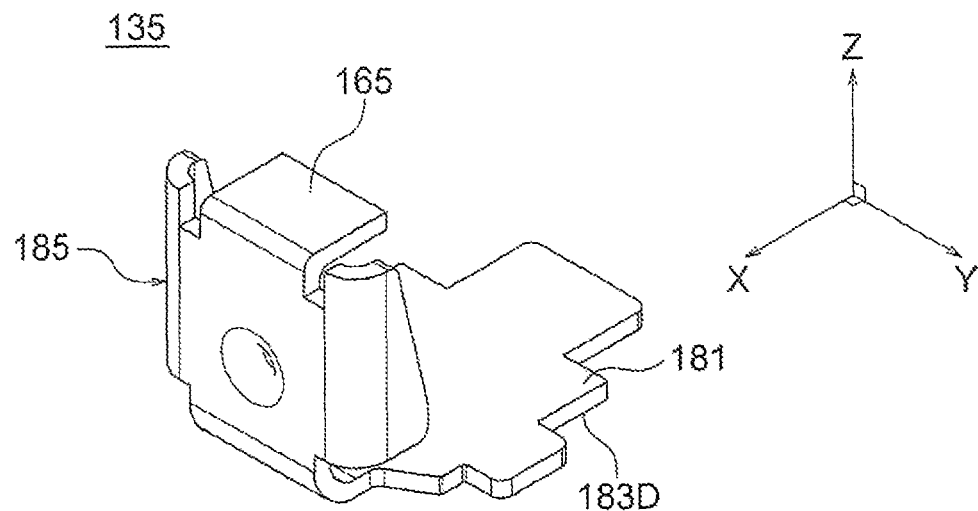
FIG. 22 is a perspective view showing a release restricting portion 135 of a third modification.
Figure 23:
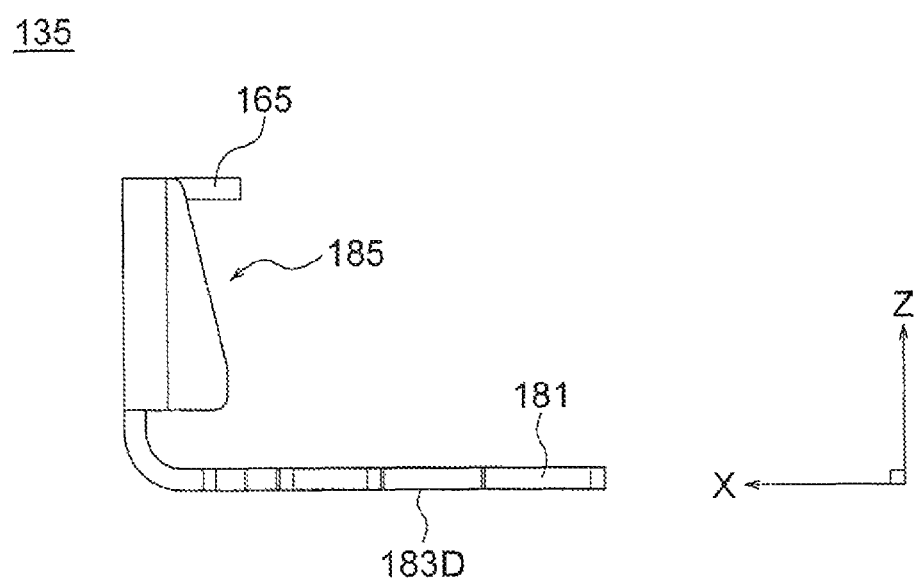
FIG. 23 is a side view showing the release restricting portion 135 of the third modification.

As shown in FIGS. 22 and 23, the shape of the restricting portion 165 of the release restricting portion 135 of the third modification is the plate shape whose normal direction is parallel to the Z-direction negative direction and the Z-direction positive direction and which projects to the opposite side (X-direction negative direction side) of the plunger 131A side.

In this way, the projecting direction of the restricting portion 165 may alternatively be the opposite side of the plunger 131A side. Even in this case, the same effect as in the second modification is exhibited.

Next, a fourth modification of the first embodiment will be described with reference to FIGS. 24 and 25.

The fourth modification is such that, in the first embodiment, a slide portion 181 of a release restricting portion 135 is provided with a support portion 305 projecting to the plunger 131A side more than a projecting portion 185. The other structure is the same as in the first embodiment and therefore a description thereof is omitted.

Figure 24:
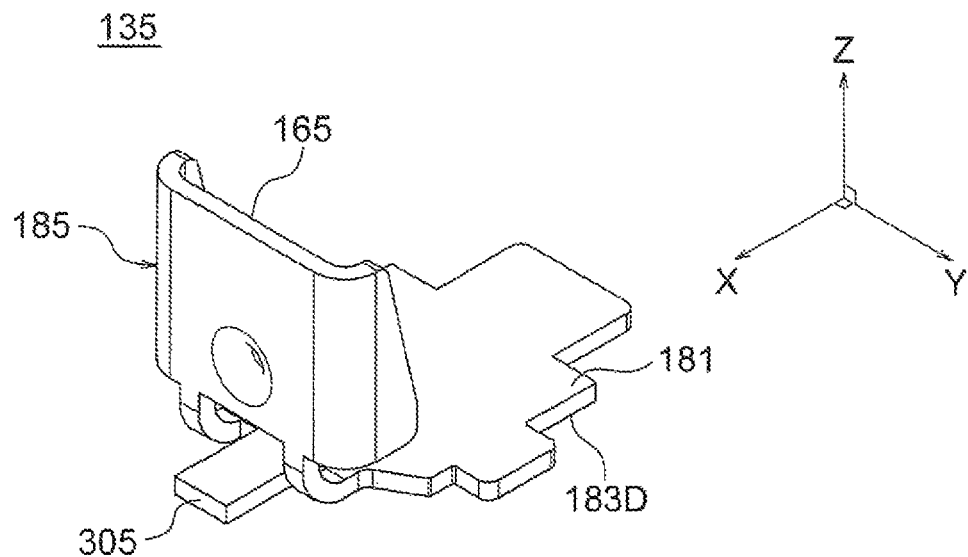
FIG. 24 is a perspective view showing a release restricting portion 135 of a fourth modification.
Figure 25:
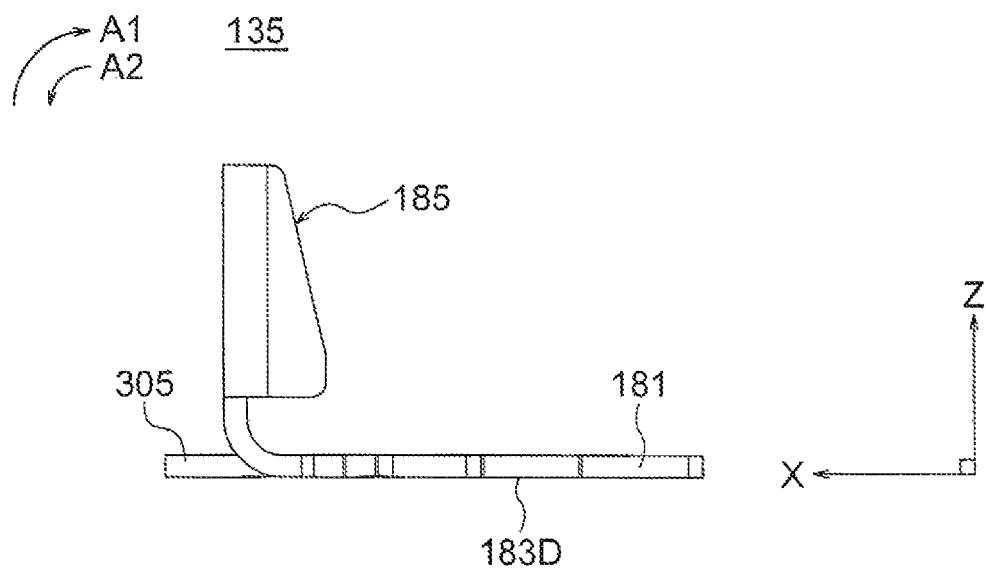
FIG. 25 is a side view showing the release restricting portion 135 of the fourth modification.
Figure 26:
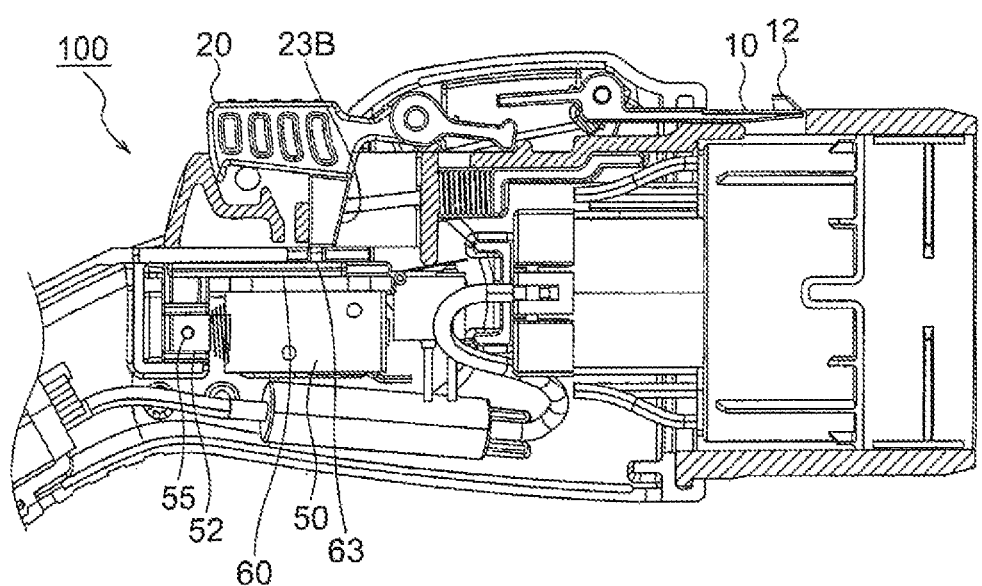
FIG. 26 is a side view (partially sectioned) showing a conventional connector 100.

As shown in FIGS. 24 and 25, the release restricting portion 135 of the fourth modification is configured such that the slide portion 181 has the support portion 305 projecting to the plunger 131A side (X-direction positive direction side) more than the projecting portion 185.

Consequently, as shown in FIG. 25, the release restricting portion 135 has an inverted T-shape in a side view as seen in the Y-direction.

Herein the reason for providing the support portion 305 to the slide portion 181 will be described.

When a release button 105A is forcibly pressed in the Z-direction negative direction in the state where the release restricting portion 135 s located at the abutting position $P_L$ (see FIG. 12), there is a possibility that, depending on an abutting manner between a restricting portion 165 and a projection 105E, not only a force is applied to the release restricting portion 135 in the Z-direction negative direction, but also a torque is applied to the release restricting portion 135 in a direction A1 or A2 in FIG. 25.

In this case, since the torque applied in the direction A1 is received by the slide portion 181, there is no possibility that the release restricting portion 135 rotates in the direction A1.

On the other hand, in the case of the release restricting portion 135 of the first embodiment (see FIG. 5), since there is no member on the X-direction positive direction side that receives a force, there is a possibility that the torque applied in the direction A2 rotates the release restricting portion 135 in the direction A2.

Therefore by providing the slide portion 181 with the support portion 305 projecting to the plunger 131A side (X-direction positive direction side) more than the projecting portion 185, since the support portion 305 receives the torque applied in the direction A2, it is possible to prevent the release restricting portion 135 from rotating in the direction A2.

While this invention has been described with reference to the embodiments, this invention is not limited thereto.

It is apparent that those skilled in the art can think of various modifications and improvements in the technical scope of this invention and it is understood that those are also included in the scope of this invention.

For example in the embodiments described above, the structure having the plate member of the L-shape or the inverted T-shape is shown as the release restricting portion 135 by way of example. However, the shape of a release restricting portion is not limited to an L-shape or an inverted T-shape as long as it is a member having a surface for abutting against the projection 105E and a surface for abutting against the plunger 131A and configured to move parallel to the moving direction of the plunger 131A.

What is claimed is:

1. An electrical connector comprising:
a locking lever that is rotatable and and adapted to lock with an inlet in a fitted state;
a release position that is provided to be movable in a first direction and a second direction parallel and opposite to the first direction and rotates the locking lever by moving in the first direction to release the locking lever;
a release restricting portion that is provided to be moveable in a third direction crossing the first and second directions and in a fourth direction parallel and opposite to the third direction and to be movable to an abutting position which is a position where the release restricting portion, in its movable range, abuts against the release portion moving in the first direction, thereby restricting a movement in the first direction of the release portion at the abutting position to restrict release of the locking lever;
a moving portion that moves the release restricting portion in the third direction; and
pressing portion that presses the release restricting portion in the fourth direction which is a direction approaching the moving portion,
wherein the moving portion is s solenoid comprising a plunger that moves in the third and fourth direction, and
wherein the release restricting portion comprises:
a slide portion that is movable in the third and fourth directions; and
contact portion which is provided to the slide portion and restricts the movement of the release potion by abutting against the release portion and against which the plunger abuts.

2. The electrical connector according to claim 1,
wherein the slide portion has a bottom surface parallel to the third and fourth directions,
wherein the contact portion is a projecting portion provided to project from the slide portion toward the release portion and having an abutting surface against which the plunger moving in the third direction abuts, and
wherein an end on the release portion side of the projecting portion has a restricting portion that abuts against the release portion moving in the first direction to restrict the release of the locking by the release portion.

3. The electrical connector according to claim 1, further comprising:
a guide bar provided on a side, opposite to a side where the plunger projects, of the solenoid and configured to move in the third and fourth directions in response to a movement of the plunger; and
a switch provided to be able to be operated with the guide bar and configured to produce first information indicating a position of the plunger in a state operated with the guide bar and second information indicating a position of the plunger in a state not operated with the guide bar.

4. The electrical connector according to claim 3, further comprising a holding portion holding the solenoid and the switch.

5. The electrical connector according to claim 1, further comprising an outer shell housing the slide portion,
wherein, in a state of restricting the release of the locking, the slide portion is disposed at a position where at least a part of the slide portion can be visually recognized from the outside of the outer shell.

6. The electrical connector according to claim 1, further comprising:
a guide portion provided to project in the third direction from the contact portion; and
a recess which is provided on the outer shell and into which the guide portion is inserted.

7. The connector according to claim 2, wherein the restricting portion has plate shape whose normal direction, is parallel to the first and second directions and which projects to the plunger side.

8. The electrical connector according to claim 2, wherein the restricting portion has a plate shape whose normal direction is parallel to the first and second directions and which projects to a side opposite to the plunger side.

9. The electrical connector according to claim 2, wherein the slide portion has a support portion projecting to the plunger side more than the projecting portion.

* * * * *